(12) United States Patent
Schiller et al.

(10) Patent No.: US 10,076,159 B2
(45) Date of Patent: *Sep. 18, 2018

(54) SOIL-SHEDDING ARTICLE OF FOOTWEAR, AND METHOD OF USING THE SAME

(71) Applicant: NIKE, INC., Beaverton, OR (US)

(72) Inventors: Denis Schiller, Vancouver, WA (US); Caleb W. Dyer, Beaverton, OR (US); Zachary C. Wright, Beaverton, OR (US); Jeremy D. Walker, Portland, OR (US); Myron Maurer, West Linn, OR (US); Eun Kyung Lee, Beaverton, OR (US)

(73) Assignee: NIKE, INC., Beaverton, OR (US)

( * ) Notice: Subject to any disclaimer, the term of this patent is extended or adjusted under 35 U.S.C. 154(b) by 438 days.

This patent is subject to a terminal disclaimer.

(21) Appl. No.: 14/813,553

(22) Filed: Jul. 30, 2015

(65) Prior Publication Data

US 2016/0058109 A1    Mar. 3, 2016

Related U.S. Application Data

(60) Provisional application No. 62/042,744, filed on Aug. 27, 2014, provisional application No. 62/042,719, filed on Aug. 27, 2014.

(51) Int. Cl.
*A43B 13/04* (2006.01)
*B29D 35/12* (2010.01)
*A43B 13/02* (2006.01)
*A43B 13/12* (2006.01)
*A43B 13/22* (2006.01)

(52) U.S. Cl.
CPC .............. *A43B 13/04* (2013.01); *A43B 13/02* (2013.01); *A43B 13/122* (2013.01); *A43B 13/22* (2013.01); *A43B 13/223* (2013.01); *B29D 35/122* (2013.01); *Y10T 428/24802* (2015.01)

(58) Field of Classification Search
CPC ....... A43B 13/02; A43B 13/04; A43B 13/122; A43B 13/22; A43B 13/223
See application file for complete search history.

(56) References Cited

U.S. PATENT DOCUMENTS

| 2,920,983 A | 1/1960 | Bugosh |
| 3,463,662 A | 8/1969 | Hodes |
| 3,637,001 A | 1/1972 | Roberts et al. |

(Continued)

FOREIGN PATENT DOCUMENTS

| CN | 1890097 | 1/2007 |
| CN | 201157028 Y | 12/2008 |

(Continued)

OTHER PUBLICATIONS

Machine translation of CN 201445011 acquired on Aug. 3, 2017.*

(Continued)

*Primary Examiner* — Gerard Higgins
(74) *Attorney, Agent, or Firm* — Thomas | Horstemeyer, LLP

(57) ABSTRACT

Disclosed herein are articles of footwear, and methods of manufacturing articles of footwear, having an open-cell foam present on at least a portion of the outsole. The open-cell foam is effective in reducing soil accumulation on the outsole when the footwear is worn on unpaved surfaces.

28 Claims, 17 Drawing Sheets

(56) References Cited

U.S. PATENT DOCUMENTS

| | | | |
|---|---|---|---|
| 4,118,354 A | 10/1978 | Harada et al. | |
| 4,271,608 A | 6/1981 | Tomuro | |
| 4,501,591 A | 2/1985 | Ucci et al. | |
| 4,520,138 A | 5/1985 | Himes | |
| 4,523,005 A | 6/1985 | Szycher | |
| 4,924,608 A | 5/1990 | Mogonye | |
| 4,990,357 A | 2/1991 | Karakelle et al. | |
| 5,120,816 A | 6/1992 | Gould et al. | |
| 5,160,790 A | 11/1992 | Elton | |
| 5,480,377 A | 1/1996 | Cartmell et al. | |
| 5,576,072 A | 11/1996 | Hostettler et al. | |
| 5,591,779 A | 1/1997 | Bleys et al. | |
| 5,763,335 A | 6/1998 | Hermann | |
| 5,832,636 A | 11/1998 | Lyden et al. | |
| 5,943,792 A | 8/1999 | Powell | |
| 5,969,076 A | 10/1999 | Lai et al. | |
| 6,003,191 A | 12/1999 | Sherry et al. | |
| 6,011,104 A | 1/2000 | Udy | |
| 6,046,295 A | 4/2000 | Frisch, Jr. et al. | |
| 6,076,283 A | 6/2000 | Boie | |
| 6,112,380 A | 9/2000 | Dolan et al. | |
| 6,162,369 A | 12/2000 | Allewaert et al. | |
| 6,203,812 B1 | 3/2001 | Ehrhard et al. | |
| 6,335,392 B1 | 1/2002 | Umezawa et al. | |
| 6,367,167 B1 | 4/2002 | Krstic et al. | |
| 6,698,110 B1 | 3/2004 | Robbins | |
| 6,782,642 B2 | 8/2004 | Knoche et al. | |
| 6,855,743 B1 | 2/2005 | Gvozdic | |
| 6,874,251 B2 | 4/2005 | Moretti | |
| 6,922,918 B2 | 8/2005 | Issler | |
| 6,948,264 B1 | 9/2005 | Lyden | |
| 6,949,271 B2 | 9/2005 | Shannon et al. | |
| 7,020,988 B1 | 4/2006 | Holden et al. | |
| 7,169,720 B2 | 1/2007 | Etchells et al. | |
| 7,373,739 B2 | 5/2008 | Doerer et al. | |
| 7,451,511 B2 | 11/2008 | Ellis et al. | |
| 7,451,557 B2 | 11/2008 | McDonald et al. | |
| 7,594,345 B2 | 9/2009 | Fusco | |
| 7,752,775 B2 | 7/2010 | Lyden | |
| 7,785,521 B1 | 8/2010 | Chen | |
| 7,814,687 B2 | 10/2010 | Cook et al. | |
| 7,832,120 B2 | 11/2010 | Jung | |
| 7,845,096 B2 | 12/2010 | Ellis et al. | |
| 7,854,076 B2 | 12/2010 | Keppler et al. | |
| 8,110,242 B2 | 2/2012 | Hawkins et al. | |
| 8,291,617 B2 | 10/2012 | Halberstadt et al. | |
| 8,303,977 B2 | 11/2012 | Kuzma et al. | |
| 8,609,766 B2 | 12/2013 | Bette | |
| 8,791,200 B2 | 7/2014 | Kocher et al. | |
| 8,796,394 B2 | 8/2014 | Messersmith et al. | |
| 8,853,289 B2 * | 10/2014 | Smith | C08J 9/00 521/140 |
| 8,906,497 B2 | 12/2014 | Marchgraber et al. | |
| 9,139,684 B2 | 9/2015 | Coneski et al. | |
| 9,206,114 B1 | 12/2015 | Coneski et al. | |
| 9,392,841 B2 | 7/2016 | Walker et al. | |
| 2001/0053897 A1 | 12/2001 | Frate et al. | |
| 2002/0116843 A1 | 8/2002 | Harrison | |
| 2002/0188057 A1 | 12/2002 | Chen | |
| 2003/0074718 A1 | 4/2003 | English | |
| 2003/0213148 A1 | 11/2003 | Knowles | |
| 2003/0226283 A1 | 12/2003 | Braunschweiler | |
| 2004/0020080 A1 | 2/2004 | Cox et al. | |
| 2004/0147188 A1 | 7/2004 | Johnson et al. | |
| 2004/0255362 A1 | 12/2004 | Soerens et al. | |
| 2005/0288440 A1 | 12/2005 | Chou et al. | |
| 2006/0035030 A1 | 2/2006 | Shannon et al. | |
| 2006/0141186 A1 | 6/2006 | Janssen et al. | |
| 2007/0017124 A1 | 1/2007 | Koo et al. | |
| 2007/0124960 A1 | 6/2007 | Friedman | |
| 2007/0141306 A1 | 6/2007 | Kasai et al. | |
| 2008/0120869 A1 | 5/2008 | Roy et al. | |
| 2008/0155857 A1 | 7/2008 | Rosen | |
| 2008/0241371 A1 | 10/2008 | Havelka et al. | |
| 2008/0314287 A1 | 12/2008 | Clark et al. | |
| 2009/0084477 A1 | 4/2009 | Sandstrom et al. | |
| 2009/0090031 A1 | 4/2009 | Jung | |
| 2009/0234039 A1 | 9/2009 | Schutte et al. | |
| 2009/0313855 A1 | 12/2009 | Skirrow | |
| 2010/0048752 A1 | 2/2010 | Vignola et al. | |
| 2010/0083534 A1 | 4/2010 | Howlett | |
| 2010/0109200 A1 | 5/2010 | Cox et al. | |
| 2010/0113733 A1 | 5/2010 | Cox et al. | |
| 2010/0146824 A1 | 6/2010 | Sensini | |
| 2010/0154253 A1 | 6/2010 | Imazato et al. | |
| 2010/0215707 A1 | 8/2010 | McDonald et al. | |
| 2010/0323573 A1 | 12/2010 | Chu et al. | |
| 2011/0008612 A1 | 1/2011 | Lee | |
| 2011/0112236 A1 | 5/2011 | Ding | |
| 2011/0287929 A1 * | 11/2011 | Smith | C08J 9/00 502/402 |
| 2012/0088602 A1 | 4/2012 | Morken | |
| 2012/0151805 A1 | 6/2012 | Polegato Moretti | |
| 2012/0210608 A1 | 8/2012 | Baker et al. | |
| 2012/0216423 A1 | 8/2012 | Lyden | |
| 2012/0216424 A1 | 8/2012 | Lyden | |
| 2012/0260535 A1 | 10/2012 | Tsang | |
| 2012/0312192 A1 | 12/2012 | Detty et al. | |
| 2013/0109804 A1 | 5/2013 | Kusaka et al. | |
| 2013/0255103 A1 | 10/2013 | Dua et al. | |
| 2013/0260104 A1 | 10/2013 | Dua et al. | |
| 2013/0260629 A1 | 10/2013 | Dua et al. | |
| 2014/0024768 A1 | 1/2014 | Coneski et al. | |
| 2014/0075791 A1 | 3/2014 | Smith et al. | |
| 2014/0217636 A1 | 8/2014 | Skaja et al. | |
| 2015/0141539 A1 | 5/2015 | Lee | |
| 2015/0307745 A1 | 10/2015 | Popa et al. | |
| 2015/0353474 A1 | 12/2015 | Coneski et al. | |
| 2015/0353741 A1 | 12/2015 | Liao | |

FOREIGN PATENT DOCUMENTS

| | | |
|---|---|---|
| CN | 201360601 Y | 12/2009 |
| CN | 201445011 U | 5/2010 |
| CN | 101873812 | 10/2010 |
| CN | 101953525 A | 1/2011 |
| CN | 101953534 A | 1/2011 |
| CN | 102038315 A | 5/2011 |
| CN | 203952576 U | 11/2014 |
| CN | 104549961 A | 4/2015 |
| DE | 4138941 A1 | 6/1993 |
| DE | 29602823 U1 | 4/1996 |
| DE | 102013221204 | 4/2015 |
| EP | 1894482 A2 | 3/2008 |
| EP | 2030517 A1 | 3/2009 |
| EP | 2292113 A2 | 3/2011 |
| EP | 2462908 A1 | 6/2012 |
| GB | 2313537 A | 12/1997 |
| JP | H06253905 | 9/1994 |
| JP | H08258511 | 10/1996 |
| JP | H105005 | 1/1998 |
| JP | 2000166609 A | 6/2000 |
| JP | 2000308501 A | 11/2000 |
| JP | 2002325601 A | 11/2002 |
| JP | 2005111691 A | 4/2005 |
| JP | 2008260889 A | 10/2008 |
| JP | 2010099332 A | 5/2010 |
| JP | 4864227 B2 | 2/2012 |
| KR | 100750324 B1 | 8/2007 |
| KR | 20120124616 A | 11/2012 |
| KR | 101232846 B1 | 2/2013 |
| WO | 0043449 | 7/2000 |
| WO | WO 2005/000061 A1 | 1/2005 |
| WO | WO 2006/015325 A1 | 2/2006 |
| WO | WO 2007/090245 A1 | 8/2007 |
| WO | WO 2007/135069 A1 | 11/2007 |
| WO | WO 2013/106658 A1 | 7/2013 |
| WO | 2014025161 A | 2/2014 |

OTHER PUBLICATIONS

Alf et al., Chemical vapor deposition of conformal, functional, and responsive polymer films, Adv. Mater., 22(18):1993-2027 (2010).

(56) References Cited

OTHER PUBLICATIONS

Arkema, Pebax® Polyether Block Amides brochure, applicant's internal files Jun. 22, 2015.
Chen et al., An new avenue to nonfouling materials, Adv. Mater., 20(2):335-8 (2008).
International Search Report and Written Opinion for International Application No. PCT/US2015/047082, dated Nov. 26, 2015 (15 pages).
International Search Report and Written Opinion for International Application No. PCT/US2015/047083, dated Nov. 26, 2015 (15 pages).
International Search Report and Written Opinion for International Application No. PCT/US2015/047084, dated Nov. 27, 2015 (16 pages).
International Search Report and Written Opinion for International Application No. PCT/US2015/047086, dated Nov. 26, 2015 (15 pages).
International Search Report and Written Opinion for International Application No. PCT/US2015/047087, dated Dec. 8, 2015 (15 pages).
Jiang et al., Ultralow-fouling, functionalizable, and hydrolyzable zwitterionic materials and their derivatives for biological applications, Adv. Mater., 22(9):920-32 (2010).
Lee et al., Mechanical properties of amphiphilic urethane acrylate ionomer hydrogels having heterophasic gel structure, Coll. Polymer Sci., 277(2-3):265-9 (1999).
Lubrizol Corporation, "Medical Device Solutions," Brochure (2014).
Lubrizol Corporation, "Tecophilic Extrusion Grade," Technical Data Sheet (2013).
Lubrizol Corporation, "Tecophilic Hydrogel," Technical Data Sheet (2013).
Lubrizol Corporation, "Tecophilic Solution Grade," Technical Data Sheet (2013).
Lubrizol Corporation, Your Link to: Advanced Wound Care brochure (Sep. 2013).
Salerno-Kochan et al., "Materials Used in Functional Outerwear—Characteristics and Customer Preferences," in Science in Research and Practice, pp. 159-167 (Eds. Chochół Andrzej, Sep. 2014).
Shao et al., Difference in hydration between carboxybetaine and sulfobetained, J. Phys. Chem. B, 114(49):16625-31 (2010).
U.S. Appl. No. 14/813,548, "Soil-Shedding Article of Footwear, Components Thereof, and Methods of Making the Article", filed Jul. 30, 2015.
U.S. Appl. No. 14/814,089, "Article of Footwear with Soil-Shedding Performance", filed Jul. 30, 2015.
U.S. Appl. No. 14/814,097, "Article of Footwear with Soil-Shedding Performance", filed Jul. 30, 2015.
U.S. Appl. No. 14/814,107, "Article of Footwear with Soil-Shedding Performance", filed Jul. 30, 2015.
U.S. Appl. No. 14/814,123, "Article of Footwear with Soil-Shedding Performance", filed Jul. 30, 2015.
U.S. Appl. No. 14/814,131, "Article of Footwear with Soil-Shedding Performance", filed Jul. 30, 2015.
U.S. Appl. No. 14/814,191, "Article of Footwear with Soil-Shedding Performance", filed Jul. 30, 2015.
U.S. Appl. No. 14/814,195, "Article of Footwear with Soil-Shedding Performance", filed Jul. 30, 2015.
U.S. Appl. No. 14/814,198, "Article of Footwear with Soil-Shedding Performance", filed Jul. 30, 2015.
U.S. Appl. No. 14/814,204, "Article of Footwear with Soil-Shedding Performance", filed Jul. 30, 2015.
U.S. Appl. No. 14/814,208, "Article of Footwear with Soil-Shedding Performance", filed Jul. 30, 2015.
U.S. Appl. No. 14/814,214, "Article of Footwear with Soil-Shedding Performance", filed Jul. 30, 2015.
U.S. Appl. No. 14/814,219, "Article of Footwear with Soil-Shedding Performance", filed Jul. 30, 2015.
U.S. Appl. No. 14/814,248, "Article of Footwear with Soil-Shedding Performance", filed Jul. 30, 2015.
Wikipedia: "Glass transition," XP002751026, retrieved on Dec. 4, 2015, from https://en.wikipedia.org/wiki/Glass_transition, modified Oct. 3, 2015 (11 pages).
Yang et al., The effect of lightly crosslinked poly(carboxybetained) hydrogel coating on the performance of sensors in whole blood, Biomaterials, 33:7945-51 (2012).
Zwitter Technology: a new technology platform for biofouling control, Seattle, Washington, Jan. 10, 2014.
Garcia, M.A., "Patent Picks: Marine Coating Technologies," Chemical & Engineering News, 94(4):34 (Jan. 25, 2016).
Invitation to Pay Additional Fees and Communication Relating to the Results of the Partial International Search for International Application No. PCT/US2015/047081, dated Nov. 26, 2015 (5 pages).
Search Report for related GB Application No. 1515179.8, dated Mar. 22, 2016 (4 pages).
Written Opinion of the International Searching Authority for related International Application No. PCT/US2015/047081, dated Mar. 22, 2016 (7 pages).
Dyson, R.W. "Specialty Polymers" Blackie & Son Ltd. (1987).
Retrieved from the Internet: URL:https://en.wikipedia.org/wiki/Gel#Hydrogels [retrieved on Aug. 24, 2016].
Traubel, H. "New Materials Permeable to Water Vapor" Springer; DOI: 10.1007/978-3-642-59978-1.
Lubrizol Estane® MVT 70AT3 Thermoplastic Polyurethane, Moisture Vapor Transmission.
Paleos, "What are Hydrogels?", 2012, p. 1-4, acquired from http://pittsburghplastics.com/assets/files/What%20Are%v 20Hydrogels.pdf.
Notice of Allowance for U.S. Appl. No. 14/814,214, dated Aug. 10, 2016 (8 pages).
Notice of Allowance for U.S. Appl. No. 14/814,219, dated Mar. 31, 2016 (9 pages).

\* cited by examiner

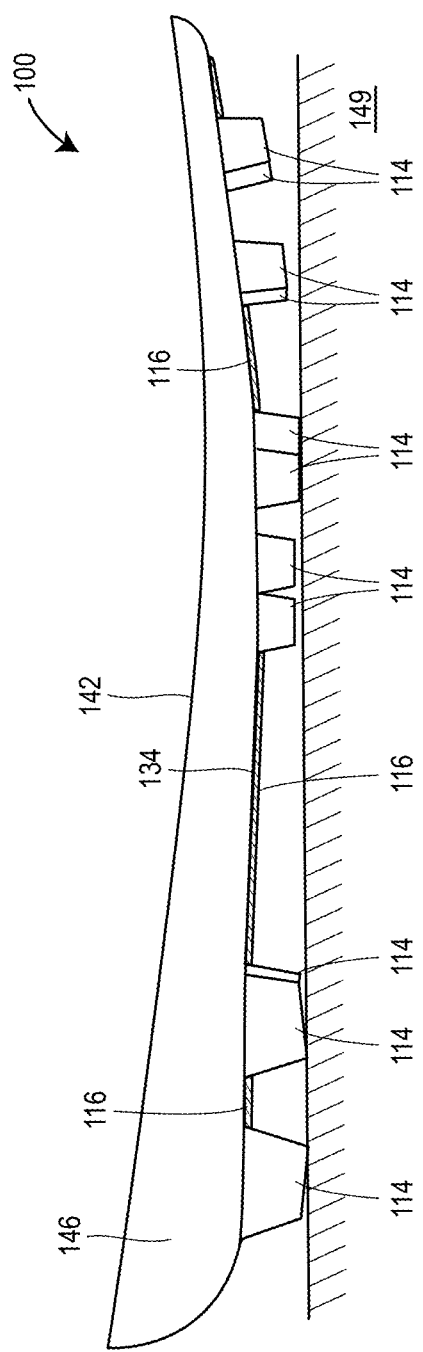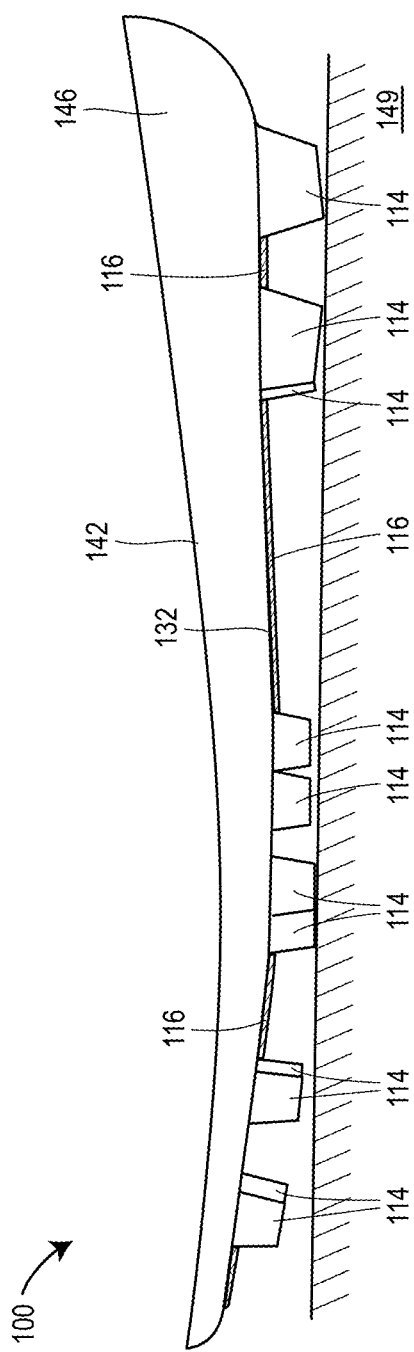
FIG. 3
FIG. 4

SOIL-SHEDDING ARTICLE OF FOOTWEAR, AND METHOD OF USING THE SAME

CROSS-REFERENCE TO RELATED APPLICATIONS

This application claims the benefit under 35 USC § 119(e) of U.S. provisional patent application No. 62/042,744 filed Aug. 27, 2014, and U.S. provisional patent application No. 62/042,719 filed Aug. 27, 2014, the disclosures of which are incorporated herein by reference to the extent that they do not conflict with the present disclosure.

FIELD

This application generally relates to articles of footwear, and more specifically to articles of footwear and components thereof, including outsoles, that may be used in conditions conducive to the accumulation of soil on the outsoles.

BACKGROUND

Articles of footwear of various types are frequently used for a variety of activities including outdoor activities, military use, and competitive sports. The outsoles of these types of footwear often are designed to provide traction on soft and slippery surfaces, such as unpaved surfaces including grass and dirt. For example, exaggerated tread patterns, lugs, or cleats (both integral and removable), and rubber formulations which provide improved traction under wet conditions, have been used to improve the level of traction provided by the outsoles. While these conventional means generally help give footwear improved traction, the outsoles often accumulate soil (e.g., inorganic materials such as mud, dirt, sand and gravel, organic material such as grass, turf, and other vegetation, and combinations of inorganic and organic materials) when the footwear is used on unpaved surfaces. In some instances, the soil can accumulate in the tread pattern (when a tread pattern is present), around and between lugs (when lugs are present), or on shafts of the cleats, in the spaces surrounding the cleats, and in the interstitial regions between the cleats (when cleats are present). The accumulations of soil can weigh down the footwear and interfere with the traction between the outsole and the ground.

BRIEF DESCRIPTION OF THE DRAWINGS

For a more complete understanding of the disclosure, reference should be made to the following detailed description and accompanying drawings wherein:

FIG. 3 is a lateral side view of the outsole shown in FIG. 2;

FIG. 4 is a medial side view of the outsole shown in FIG. 2;

Figure 1:
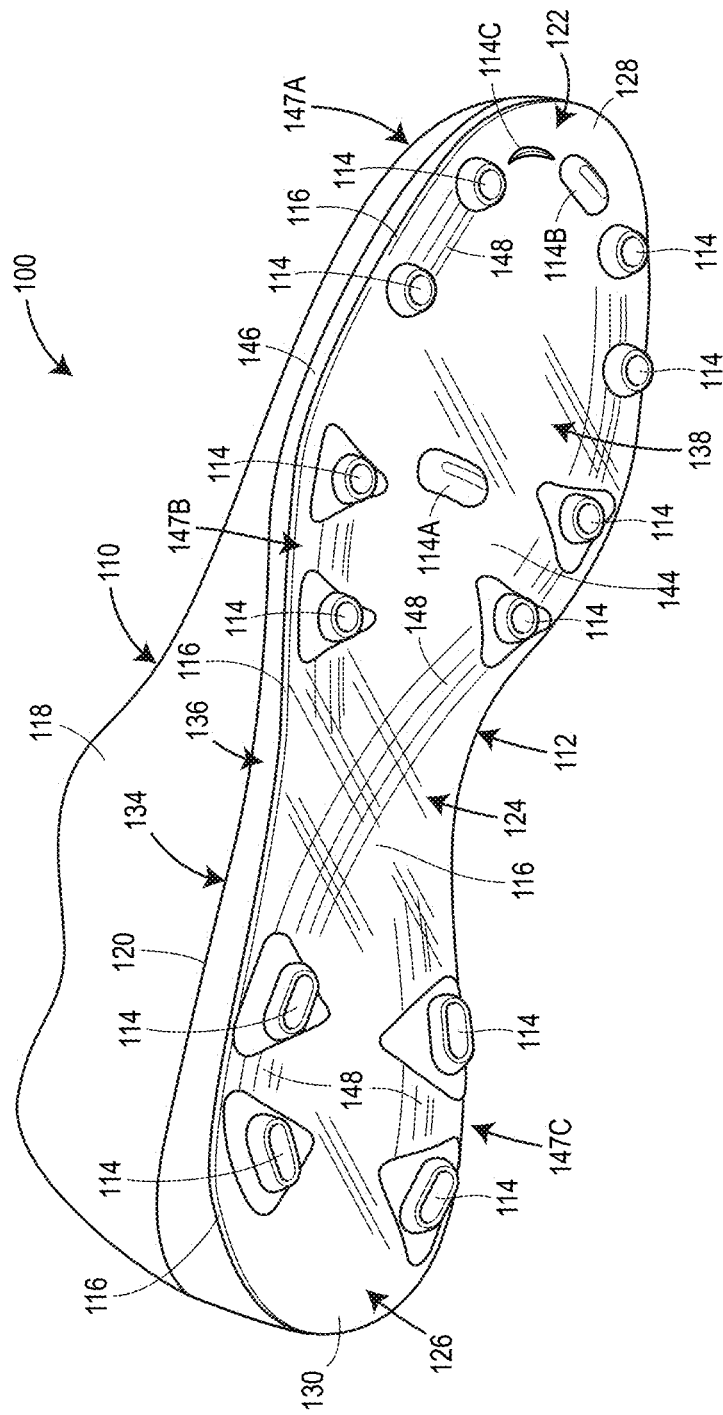
FIG. 1 is a bottom isometric view of an article of footwear in an aspect of the present disclosure having an outsole including a material (e.g., a film) in accordance with the present disclosure.

The articles of footwear shown in the figures are illustrated for use with a user's right foot. However, it is understood that the following discussion applies correspondingly to left-footed articles of footwear as well. Further, directional orientations for an article, such as "upward," "downward," "top," "bottom," "left," "right," and the like, are used for ease of discussion, and are not intended to limit the use of the article to any particular orientation.

DESCRIPTION

It has now been discovered that particular materials disposed on a ground-facing surface of an outsole of an article of footwear can be effective at preventing or reducing the accumulation of soil on the outsole during wear on unpaved surfaces. Accordingly, the present disclosure is directed to articles of footwear and footwear components (e.g., footwear outsoles, and the like) at least a portion of which are composed of a material comprising an ethylene-alkyl acrylate copolymer component consisting of an ethylene-alkyl acrylate copolymer or a combination of two or more ethylene-alkyl acrylate copolymers. The concentration of the ethylene-alkyl acrylate copolymer component present in the material can be from 40 to 80 parts per hundred by weight based on a total polymer content of the material. As discussed below, it has been found that the inclusion of these materials in articles of footwear and components of footwear can prevent or reduce the accumulation of soil on the outsole during wear on unpaved surfaces. Preventing or reducing soil accumulation on the outsole can help preserve traction during wear. Preventing or reducing soil accumulation on outsoles during wear on unpaved surfaces also can significantly affect the weight of accumulated soil adhered to the outsole during wear, reducing fatigue to the wearer caused by the adhered soil.

The terms "article of footwear," "articles of footwear," and "footwear" are intended to be used interchangeably to refer to the same article. Typically, the term "article of footwear" will be used in a first instance, and the term "footwear" may be subsequently used to refer to the same article for ease of readability.

As used herein, "ground-facing" is understood to refer to the position of an element or surface when the element or surface is present on a component of an article of footwear or on an article of footwear as the article of footwear is conventionally worn on a foot. For example, a ground-facing surface or side of an outsole is the side or surface of the outsole which faces the ground when the outsole is part of a conventional article of footwear, and the article of footwear is worn on a foot in a conventional manner.

References herein to "soil" include any of a variety of materials commonly present on a ground or playing surface and which might otherwise adhere to an outsole or areas adjacent to an outsole such as an exposed midsole of an article of footwear. Soil can include inorganic materials such as mud, sand, dirt, and gravel; organic matter such as grass, turf, leaves, other vegetation, and excrement; combinations of inorganic and organic materials such as clay; other materials such as ground rubber particles, and any combinations thereof. While not wishing to be bound by theory, it is believed that the material as described herein can exhibit a lower level of adhesion to soil as compared to other materials. In aspects of the present disclosure, the material can provide compressive compliance when present on an outsole. Additionally, when the material is present in the form of an open-cell foam, the open-cell foam can take up and expel water. In particular, it is believed that the compressive compliance provided by the material, the chemical nature of the material, or both in combination, can disrupt the adhesion of soil on the outsoles and the cohesion of soil particles to each other. Additionally, when the material is present in the form of an open-cell foam which takes up water, the expulsion of water from the foam, alone or in combination with the foam's compressive compliance and/or its chemical nature, can further disrupt the adhesion of soil on the outsoles and the cohesion of soil particles to each other.

The disruption in the adhesion and/or cohesion of soil are believed to be mechanisms at least partially responsible for preventing (or otherwise reducing) soil from accumulating on the outsoles—mechanisms achieved due to the presence of the material. As can be appreciated, preventing soil from accumulating on an outsole can improve the performance of traction elements present on the outsole during wear on unpaved surfaces, can prevent the footwear from gaining weight due to accumulated soil during wear, can preserve ball handling performance of the outsole, and thus can provide significant benefits to a wearer as compared to an article of footwear without the material present on the outsole.

In a first aspect, the present disclosure is directed to an outsole for an article of footwear, the outsole comprising: a ground-facing surface of the outsole and a surface of the outsole opposing the ground-facing surface, the opposing surface configured to be secured to an upper for an article of footwear, wherein a material is present on at least a portion of the ground-facing surface of the outsole, the material compositionally comprising an ethylene-alkyl acrylate copolymer component consisting of an ethylene-alkyl acrylate copolymer or a combination of two or more ethylene-alkyl acrylate copolymers, wherein a concentration of the ethylene-alkyl acrylate copolymer component present in the material is from 40 to 80 parts per hundred by weight based on a total polymer content of the material.

The term "polymer" refers to a molecule having polymerized units of one or more species of monomer. The term "polymer" is understood to include homopolymers and copolymers. The term "copolymer" refers to a polymer having polymerized units of two or more species of monomer, and is understood to include terpolymers or other polymers formed from multiple different monomers.

The material of the present disclosure can be present as one or more layers disposed on, or otherwise affixed to, at least a portion of a surface (e.g., a surface of an outsole of an article of footwear). In some aspects, the layer(s) is provided as a single continuous segment on, or affixed to, the surface. Alternatively, the layer(s) is provided in multiple discontinuous segments on, or affixed to, the surface. The disposition of the material on the surface is not intended to be limited by any application process (e.g., extrusion, co-extrusion, injection molding, lamination, spray coating, etc.) by which the material is applied to affixed to the surface.

The material can be present in the form of an open-cell foam. When present in the form of an open-cell foam, the material can have a density of greater than 1.5 pounds per cubic foot (lbs./ft.$^3$). For example, the density of the material in open-cell foam form can be from 1.5 lbs./ft.$^3$ to 2 lbs./ft.$^3$. Further, when present as an open-cell foam, the material can have an average cell diameter ranging from 0.65 millimeters (mm) to 1.4 mm. Still further, when present as an open-cell foam, the material can have an oil absorption weight capacity of at least 27 (as determined according to the Oil Absorption Test, described herein).

The ethylene-alkyl acrylate copolymer component of the material can comprise or consist essentially of a copolymer of ethylene and methyl acrylate, or a copolymer of ethylene and ethyl acrylate, or a combination of both. The ethylene-alkyl acrylate copolymer component can comprise or consist essentially of an ethylene-alkyl acrylate copolymer having an alkyl acrylate content of between 3% and 45% based on a total weight of the copolymer. The ethylene-alkyl acrylate copolymer component can comprise or consist essentially of an ethylene-alkyl acrylate copolymer having an alkyl acrylate content of between 15% and 25% based on a total weight of the copolymer. The ethylene-alkyl acrylate copolymer component can comprise or consist essentially of ethylene-methyl acrylate (EMA), ethylene-ethyl acrylate (EEA), and combinations thereof. The ethylene-alkyl acrylate copolymer component can comprise or consist essentially of ethylene-methyl acrylate (EMA). Alternatively or in addition, the ethylene-alkyl acrylate copolymer component can comprise or consist essentially of at least one ethylene-alkyl acrylate copolymer having a melt flow rate of from 0.5 grams per ten minutes (g/10 mins.) to 4 g/10 mins., as determined according to ASTM D1238 using a 2160 gram (g) weight and a temperature of 190° C. (Unless otherwise specified, temperatures referred to herein are based on atmospheric pressure (i.e. one atmosphere).)

The terms "at least one" and "one or more of" an element are used interchangeably, and have the same meaning that includes a single element and a plurality of the elements, and may also be represented by the suffix "(s)" at the end of the element. For example, "at least one ethylene-alkyl acrylate copolymer," "one or more ethylene-alkyl acrylate copolymers," and "ethylene-alkyl acrylate copolymer(s)" may be used interchangeably and have the same meaning.

The material can further comprise a polyethylene component. The polyethylene component can comprise or consist essentially of at least one polyethylene having a density of from 0.91 grams per cubic centimeters (g/cc) to 0.95 g/cc, and a melt flow rate, as determined according to ASTM D1238 using a 2160 g weight and a temperature of 190° C., of from 0.910 g/10 mins. to 0.950 g/10 mins., from 0.917 g/10 mins. to 0.930 g/10 mins., or from 0.917 g/10 mins. to 0.923 g/10 mins.

The material can comprise from 20% to 80% by weight of the ethylene-alkyl acrylate copolymer component, and from 20% to 80% by weight of the polyethylene component. The material can comprise from 40% to 60% by weight of the ethylene-alkyl acrylate copolymer component, and from 20% to 80% by weight of the polyethylene component. The material can comprise from 50% to 60% by weight of the ethylene-alkyl acrylate copolymer component, and from 20% to 80% by weight of the polyethylene component. The recitations of a numerical range by endpoints include the endpoints and all numbers within that numerical range. For example, a concentration ranging from 40% by weight to 60% by weight includes 40% by weight, 60% by weight, and all values between 40% by weight and 60% by weight (e.g., 40.1%, 41%, 45%, 50%, 52.5%, 55%, 59%, etc.). Additionally, as used herein, a reference to a material, element, etc. having a value of a property within a range is generally understood to mean that the property has a single value which is encompassed within the described range.

References to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyethylene or polyethylene component is interpreted to include one or more polymer molecules of the polyethylene, where the polymer molecules may or may not be identical (e.g., different molecular weights and/or isomers).

At least a portion of the polymer component of the material can be crosslinked. For example, the ethylene-alkyl acrylate component can be crosslinked to itself. When present, a polyester component can be crosslinked to itself. Alternatively or in addition, when present, at least a portion of the polyester component can be crosslinked to at least a portion of the ethylene-alkyl acrylate component. When present, at least a portion of an elastomer can be crosslinked to itself. Alternatively or in addition, when present, at least a portion of the elastomer can be crosslinked to at least a portion of the ethylene-alkyl acrylate component.

The outsole of the present disclosure can be an outsole wherein the material exhibits an impact energy of from 0 Joules to 0.6 Joules, as determined according to the Impact Energy Test disclosed herein. Alternatively or in addition, an article of footwear containing the outsole can be an article that, after running in the article on a wet or damp soil surface, has at least 10% less soil by weight adhered to its outsole as compared to a second article of footwear that is identical except that it does not include an outsole having the material.

In a second aspect, the present disclosure is also directed to an article of footwear, the article comprising: an outsole having a first surface at least partially secured to the upper and an opposing second surface, wherein a material is present on at least a portion of the second surface, the material compositionally comprising an ethylene-alkyl acrylate copolymer component consisting of an ethylene-alkyl acrylate copolymer or a combination of two or more ethylene-alkyl acrylate copolymers, wherein a concentration of the ethylene-alkyl acrylate copolymer component present in the material is from 40 to 80 parts per hundred by weight based on a total polymer content of the material.

The second surface of the outsole can be the ground-facing surface of the outsole. The article of footwear can further comprise a plurality of cleats, wherein a portion of the plurality of cleats are integrally formed with the second surface of the outsole, are separately formed from the second surface of the outsole and permanently attached to the second surface of the outsole, are separately formed from the second surface of the outsole and are removably attached to the second surface of the outsole, or combinations thereof. The article of footwear can further comprise a midsole disposed at least partially between the upper and the first surface of the outsole, wherein the first surface of the outsole is operably secured to the upper with the midsole. The term "operably secured to," such as for an outsole that is operably secured to an upper, refers collectively to direct connections, indirect connections, integral formations, and combinations thereof. For instance, for an outsole that is operably secured to an upper, the outsole can be directly connected to the upper (e.g., with an adhesive), the outsole can be indirectly connected to the upper (e.g., with an intermediate midsole), can be integrally formed with the upper (e.g., as a unitary component), and combinations thereof.

In a third aspect, the present disclosure is directed to a method of manufacturing an article of footwear, comprising: providing an outsole, the outsole having a first surface and an opposing ground-facing surface, a material present on the ground-facing surface of the outsole, the material compositionally comprising an ethylene-alkyl acrylate copolymer component consisting of an ethylene-alkyl acrylate copolymer or a combination of two or more ethylene-alkyl acrylate copolymers, wherein a concentration of the ethylene-alkyl acrylate copolymer component present in the material is from 40 to 80 parts per hundred by weight based on a total polymer content of the material; providing an upper; and, securing the upper to at least a portion of the first surface of outsole. The step of securing the material can comprise stock fitting the material to the ground-facing surface of the outsole, for example, such that the material defines an external surface of the outsole. The step of providing an outsole can comprise forming at least a portion of the outsole from a second material, and the step of securing the material can comprise thermoforming the material and securing the material to the ground-facing surface of the outsole. The term "providing," such as for "providing an outsole," when recited in the claims, is not intended to require any particular delivery or receipt of the provided item. Rather, the term "providing" is merely used to recite items that will be referred to in subsequent elements of the claim(s), for purposes of clarity and ease of readability.

In a fourth aspect, the present disclosure is directed to an article of footwear, the article comprising: an outsole having a ground-facing surface, an open-cell foam material secured to at least a portion of the ground-facing surface, wherein the open-cell foam material has an average cell diameter ranging from 0.65 millimeter (mm) to 1.4 mm; and an upper secured to the outsole; wherein the article of footwear prevents or reduces soil accumulation on the outsole such that the article of footwear retains at least 10% less soil by weight as compared to a second article of footwear which is identical to the article of footwear except that the second article of footwear is free of the open-cell foam material. The article can be an article wherein the outsole further comprises a plurality of cleats. The article can be an article wherein the material is not present on or in direct contact with the plurality of cleats. The article can be an article wherein a sample of the outsole obtained in accordance with the Footwear Sampling Procedure exhibits an impact energy of from 0 Joules to 0.6 Joules, as determined according to the Impact Energy Test. The article can be an article wherein the open-cell foam material comprises an ethylene-alkyl acrylate copolymer component consisting of an ethylene-alkyl acrylate copolymer or a combination of two or more ethylene-alkyl acrylate copolymers. The article can be an article wherein a concentration of the ethylene-acrylate copolymer component present in the open-cell foam is from 40 to 80 parts per hundred by weight based on a total polymer content of the open-cell foam. The article can be an article wherein ethylene-alkyl acrylate copolymer component comprises a copolymer of ethylene and methyl acrylate, or a copolymer of ethylene and ethyl acrylate, or a combination of both. The article can be an article wherein the ethylene-alkyl acrylate copolymer component comprises an ethylene-alkyl acrylate copolymer having an alkyl acrylate content of between 3% and 45%, based on a total weight of the copolymer.

The article can be an article wherein a sample of the open-cell foam material obtained in accordance with the Footwear Sampling Procedure or the Neat Material Sampling Procedure has an absorption weight capacity of SAE 10W-30 oil of at least 27 times its weight of the open-cell foam material, as determined according to the Oil Absorption Test. The article can be an article wherein the open-cell foam material has a melt flow rate in a range of between about 0.5 g/10 mins. and about 100 grams/10 mins., as determined according to ASTM D1238 using a 2160 g weight and a temperature of 190° C. The article can be an article wherein the open-cell foam material has a thickness in a dry state of about 0.1 mm to about 12 mm. The article can be an article wherein the open-cell foam material has a tensile strength of 75 kiloPascals (kPa) to 250 kPa, as determined according to ASTM D882. The article can be an article wherein the open-cell foam material has a Young's modulus of from 0.4 megaPascals (MPa) to 2.5 MPa.

In a fifth aspect, the present disclosure is directed to a method of use of an article of footwear, the method comprising: providing an article of footwear comprising an outsole having a ground-facing surface, an open-cell foam material secured to at least a portion of the ground-facing surface, wherein the open-cell foam material has an average cell diameter ranging from 0.65 mm to 1.4 mm; and wearing the article of footwear under conditions in which the outsole comes into direct contact with wet soil, wherein the article of footwear prevents or reduces accumulation of the soil on the outsole such that the article of footwear retains at least 20% less soil by weight as compared to a second article of footwear worn under identical conditions wherein the second article of footwear is identical to the article of footwear except that the second article of footwear is free of the open-cell foam material. The method can be a method wherein the outsole further comprises a plurality of cleats. The method can be a method wherein the open-cell foam is not present on or in direct contact with the plurality of cleats. The method can be a method wherein a sample of the outsole obtained in accordance with the Footwear Sampling Procedure exhibits an impact energy of from 0 Joules to 0.6 Joules, as determined according to the Impact Energy Test. The method can be a method wherein a sample of the outsole obtained in accordance with the Footwear Sampling Procedure exhibits an impact energy of from 0.2 Joules to 0.4 Joules, as determined according to the Impact Energy Test. The method can be a method wherein the open-cell foam material comprises an ethylene-alkyl acrylate copolymer component consisting of an ethylene-alkyl acrylate copolymer or a combination of two or more ethylene-alkyl acrylate copolymers. The method can be a method wherein a concentration of the ethylene-acrylate copolymer component present in the open-cell foam material is from 40 to 80 parts per hundred by weight based on a total polymer content of the open-cell foam material.

The article of footwear of the present disclosure may be designed for a variety of uses, such as sporting, athletic, military, work-related, recreational, or casual use. Primarily, the article of footwear is intended for outdoor use on unpaved surfaces (in part or in whole), such as on a ground surface including one or more of grass, turf, gravel, sand, dirt, clay, mud, and the like, whether as an athletic performance surface or as a general outdoor surface. However, the article of footwear may also be desirable for indoor applications, such as indoor sports including dirt playing surfaces for example (e.g., indoor baseball fields with dirt infields). In preferred aspects, the article of footwear is designed for use in outdoor sporting activities, such as global football/soccer, golf, American football, rugby, baseball, running, track and field, cycling (e.g., road cycling and mountain biking), and the like. The terms "preferred" and "preferably" refer to aspects of the invention that may afford certain benefits, under certain circumstances. However, other aspects may also be preferred, under the same or other circumstances. Furthermore, the recitation of one or more preferred aspects does not imply that other aspects are not useful, and is not intended to exclude other aspects from the scope of the present disclosure.

The article of footwear optionally includes traction elements (e.g., lugs, cleats, studs, spikes, fins, blades, and the like) to provide traction on soft and slippery surfaces. Traction elements are commonly included in footwear designed for use in sports such as global football/soccer, golf, American football, rugby, baseball, and the like, which are frequently played on unpaved surfaces. Lugs and/or exaggerated tread patterns are commonly included in footwear including shoes and boots design for use under rugged outdoor conditions, such as trail running, hiking, and military use.

FIGS. 1-4 illustrate an example article of footwear of the present disclosure, referred to as an article of footwear 100, and which is depicted as footwear for use in global football/soccer applications. As shown in FIG. 1, the footwear 100 includes an upper 110 and an outsole 112 as footwear article components, where outsole 112 includes a plurality of traction elements 114 (e.g., cleats) and a material 116 secured to the outsole 112 at an external or ground-facing side of the outsole 112. While many of the footwear of the present disclosure preferably include traction elements such as cleats, it is to be understood that in other aspects, the incorporation of cleats is optional.

The upper 110 of the footwear 100 has a body 118 which may be fabricated from materials known in the art for making articles of footwear, and is configured to receive a user's foot. For example, the upper body 118 may be made from or include one or more components made from one or more of natural leather; a knit, braided, woven, or non-woven textile made in whole or in part of a natural fiber; a knit, braided, woven or non-woven textile made in whole or in part of a synthetic polymer or a synthetic polymer film; and combinations thereof. The upper 110 and components of the upper 110 may be manufactured according to conventional techniques (e.g., molding, extrusion, thermoforming, stitching, knitting). While illustrated in FIG. 1 with a generic design, the upper 110 may alternatively have any desired aesthetic design, functional design, brand designators, and the like.

The outsole 112 may be directly or otherwise operably secured to the upper 110 using any suitable mechanism or method. For example, the upper 110 may be stitched to the outsole 112, or the upper 110 may be glued to the outsole 112, such as at or near a bite line 120 of the upper 110. The footwear 100 can further include a midsole (not shown) secured between the upper 110 and the outsole 112, or can be enclosed by the outsole 112. When a midsole is present, the upper 110 may be stitched, glued, or otherwise attached to the midsole at any suitable location, such as at or below the bite line 120.

Figure 2:
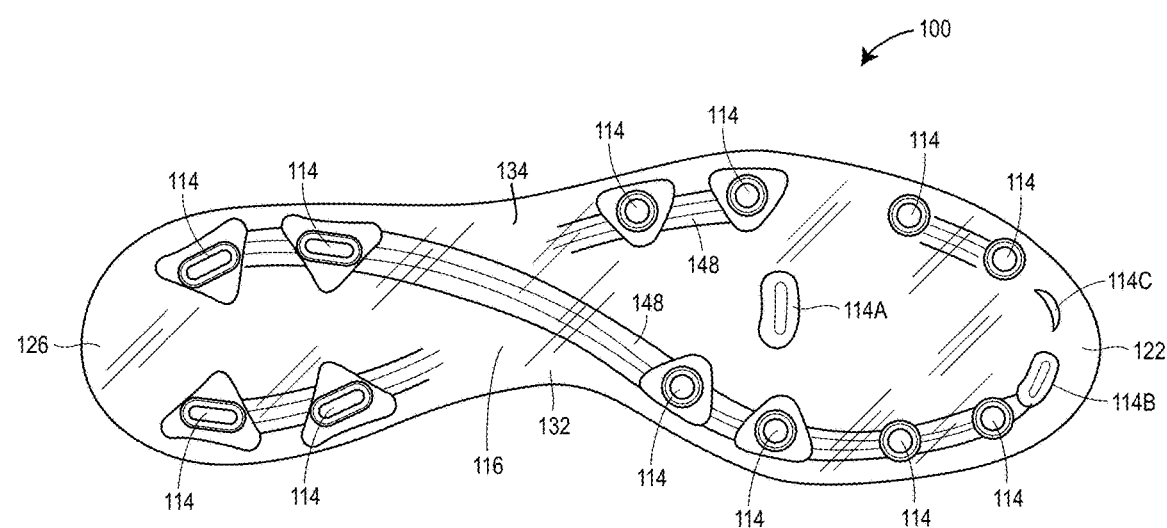
FIG. 2 is a bottom view of the outsole of the article of footwear shown in FIG. 1, where an upper of the footwear is omitted.

As further shown in FIGS. 1 and 2, the layout of outsole 112 can be segregated into a forefoot region 122, a midfoot region 124, and a heel region 126. The forefoot region 122 is disposed proximate a wearer's forefoot, the midfoot region 124 is disposed between the forefoot region 122 and the heel region 126, and the heel region 126 is disposed proximate a wearer's heel and opposite the forefoot region 122. The outsole 112 may also include a forward edge 128 at the forefoot region 122 and a rearward edge 130 at the heel region 126. In addition to these longitudinal designations, the left/right sides of outsole 112 can also be respectively designated by a medial side 132 and a lateral side 134. Each of these designations can also apply to the upper 110 and more generally to the footwear 100, and are not intended to particularly define structures or boundaries of the footwear 100, the upper 110, or the outsole 112.

The outsole 112 can optionally include a backing plate 136, which, in the shown example, extends across the forefoot region 122, the midfoot region 124, and the heel region 126. The backing plate 136 is an example backing plate member or outsole backing member for use in an article of footwear, and can provide structural integrity to the outsole 112. However, the backing plate 136 can also be flexible enough, at least in particular locations, to conform to the flexion of a wearer's foot during the dynamic motions produced during wear. For example, as shown in FIGS. 1 and 2, the backing plate 136 may include a flex region 138 at the forefoot region 122, which can facilitates flexion of the wearer's toes relative to the foot in active use of the footwear 100.

The optional backing plate 136 may have a top (or first) surface 142 (best shown in FIGS. 3 and 4), a bottom (or second) surface 144, and a sidewall 146, where the sidewall 146 can extend around the perimeter of the backing plate 136 at the forward edge 128, the rearward edge 130, the medial side 132, and the lateral side 134. The top surface 142 is the region of the backing plate 136 (and the outsole 112 more generally) that may be in contact with and operably secured to the upper 110 and/or to any present midsole or insole.

The bottom surface 144 is a ground-facing surface of the backing plate 136 that is covered (or at least partially covered) by the material 116, and would otherwise be configured to contact a ground surface, whether indoors or outdoors, if the material 116 were otherwise omitted. The bottom surface 144 is also the portion of outsole 112 that the fraction elements 114 can extend from, as discussed below.

The optional backing plate 136 can be manufactured with one or more layers, may be produced from any suitable material(s), and can provide a good interfacial bond to the material 116, as discussed below. Examples of suitable materials for the backing plate 136 include one or more of thermoplastic elastomers, thermoset polymers, elastomeric polymers, silicone polymers, natural and synthetic rubbers, composite materials (including polymers reinforced with carbon fiber and/or glass), natural leather, and metals (such as aluminum, steel and the like).

In particular aspects, the optional backing plate 136 is manufactured from one or more polymers having similar chemistries to the polymers of the material 116. In other words, the backing plate and the material disclosed herein can both comprise or consist essentially of polymers having the same or similar functional groups, and/or can both comprise or consist essentially of polymers having the same or similar levels of polarity, or can both comprise or consist essentially of thermopolymers, or combinations thereof. For example, the backing plate and the material can both comprise or consist essentially of one or more ethyl-alkyl copolymers, one or more polyolefins (e.g., thermoplastic polyolefins), or the like. The backing plate and the material can both comprise or consist essentially of thermopolymers having levels of polarity within 20% of each other, or within 10% of each other. The types of similar polymers can be beneficial for improving manufacturing compatibilities between the material 116 and the backing plate 136, and also for improving the interfacial bond strength between the polymers. Alternatively, one or more tie layers (not shown) can be applied between the backing plate 136 and the material 116 in order to improve their interlayer bonding.

The traction elements 114 may each include any suitable cleat, stud, spike, lug, fin, blade, or similar element configured to enhance traction for a wearer during cutting, turning, stopping, accelerating, and backward movement. The traction elements 114 can be arranged in any suitable pattern along the bottom surface 144 of the backing plate 136. For instance, the traction elements 114 can be distributed in groups or clusters along the outsole 112 (e.g., clusters of 2-8 traction elements 114). As best shown in FIGS. 1 and 2, the traction elements 114 can be grouped into a cluster 147A at the forefoot region 122, a cluster 147B at the midfoot region 124, and a cluster 147C at the heel region 126. In this example, six of the traction elements 114 are substantially aligned along the medial side 132 of the outsole 112, and the other six traction elements 114 are substantially aligned along the lateral side 134 of the outsole 112.

The traction elements 114 may alternatively be arranged along the outsole 112 symmetrically or non-symmetrically between the medial side 132 and the lateral side 134, as desired. Moreover, one or more of the traction elements 114 may be arranged along a centerline of outsole 112 between the medial side 132 and the lateral side 134, such as a blade 114A, as desired to enhance or otherwise modify performance.

Alternatively (or additionally), traction elements can also include one or more front-edge traction elements 114, such as one or more blades 114B, one or more fins 114C, and/or one or more cleats (not shown) operably secured to (e.g., integrally formed with) the backing plate 136 at a front-edge region between forefoot region 122 and cluster 147A. In this application, the material 116 can optionally extend across the bottom surface 144 at this front-edge region while maintaining good traction performance.

Furthermore, the traction elements 114 may each independently have any suitable dimension (e.g., shape and size). For instance, in some designs, each traction element 114 within a given cluster (e.g., clusters 147A, 147B, and 147C) may have the same or substantially the same dimensions, and/or each traction element 114 across the entirety of the outsole 112 may have the same or substantially the same dimensions. Alternatively, the traction elements 114 within each cluster may have different dimensions, and/or each fraction element 114 across the entirety of the outsole 112 may have different dimensions.

Examples of suitable shapes for the traction elements 114 include rectangular, hexagonal, cylindrical, conical, circular, square, triangular, trapezoidal, diamond, ovoid, as well as other regular or irregular shapes (e.g., curved lines, C-shapes, etc. . . . ). The traction elements 114 may also have the same or different heights, widths, and/or thicknesses as each other, as further discussed below. Further examples of suitable dimensions for the traction elements 114 and their arrangements along the backing plate 136 include those provided in soccer/global football footwear commercially available under the tradenames "TIEMPO," "HYPERVENOM," "MAGISTA," and "MERCURIAL" from Nike, Inc. of Beaverton, Oreg.

The traction elements 114 may be incorporated into the outsole or optional backing plate 136 of the outsole by any suitable mechanism such that the traction elements 114 preferably extend from the bottom surface 144. For example, as discussed below, the fraction elements 114 may be integrally formed with the backing plate 136 through a molding process. Alternatively, the outsole or optional backing plate 136 may be configured to receive removable traction elements 114, such as screw-in or snap-in traction elements 114. In these aspects, the backing plate 136 may include receiving holes (e.g., threaded or snap-fit holes, not shown), and the traction elements 114 can be screwed or snapped into the receiving holes to secure the traction elements 114 to the outsole or backing plate 136. In some applications, the receiving holes may be raised or otherwise protrude from the general plane of the bottom surface 144 of the outsole or backing plate 136 (e.g., for soft ground (SG) footwear). Alternatively, the receiving holes may be flush with the bottom surface 144.

In further examples, a first portion of the traction elements 114 can be integrally formed with the outsole or optional backing plate 136 and a second portion of the traction elements 114 can be secured with screw-in, snap-in, or other similar mechanisms (e.g., for SG pro footwear). The fraction elements 114 may also be configured as short studs for use with artificial ground (AG) footwear, if desired. In some applications, the receiving holes may be raised or otherwise protrude from the general plane of the bottom surface 144 of the backing plate 136. Alternatively, the receiving holes may be flush with the bottom surface 144.

The traction elements 114 can be fabricated from any suitable material for use with the outsole 112 or optional backing plate 136. For example, the traction elements 114 may include one or more of thermoplastic elastomers, thermoset polymers, elastomeric polymers, silicone polymers, natural and synthetic rubbers, composite materials (including polymers reinforced with carbon fiber and/or glass), natural leather, and metals (such as aluminum, steel and the like). In aspects in which the traction elements 114 are integrally formed with the outsole or backing plate 112 (e.g., molded together), the fraction elements 114 preferably include the same materials as the outsole or backing plate 112 (e.g., thermoplastic elastomers). Alternatively, in aspects in which the traction elements 114 are separate and insertable into receiving holes of the backing plate 112, the traction elements 114 can include any suitable materials that can be secured in the receiving holes of the outsole or backing plate 112 (e.g., metals and thermoplastic elastomers).

The optional backing plate 136 (and more generally, the outsole 112) may also include other features other than the traction elements 114 that can provide support or flexibility to the outsole and/or for aesthetic design purposes. For instance, the backing plate 136 may also include ridges 148 that may be raised or otherwise protrude from the general plane of the bottom surface 144. As shown, ridges 148 can extend along the arrangement pathways of the traction elements 114, if desired. These features (e.g., ridges 148) can be integrally formed into the backing plate 136, or alternatively, be removable features that are securable to the backing plate 136. Suitable materials for these features include those discussed above for the traction elements 114.

The optional backing plate 136 (and more generally, the outsole 112) may also include other features such as exaggerated tread patterns, lugs, and the like, which are configured to contact the ground or playing surface to increase fraction, to enhance performance, or for aesthetic design purposes. These other features can be present on the outsole in place of or in addition to the traction elements 114, and can be formed from the suitable materials discussed above for the traction elements 114.

As further shown in FIGS. 3 and 4, the traction elements 114 can be arranged such that when footwear 100 rests on a flat surface 149, the ground-facing surface 144 of the outsole or optional backing plate 136 and the material 116 are offset from the flat surface 149. As such, the traction elements 114 can receive the greatest levels of shear and abrasive contact with surfaces during use, such as by digging into soil during cutting, turning, stopping, accelerating, backward movements, and the like. In comparison, the material 116 at its offset location can remain partially protected from a significant portion of these shear and abrasive conditions, thereby preserving its integrity during use.

Figure 5:
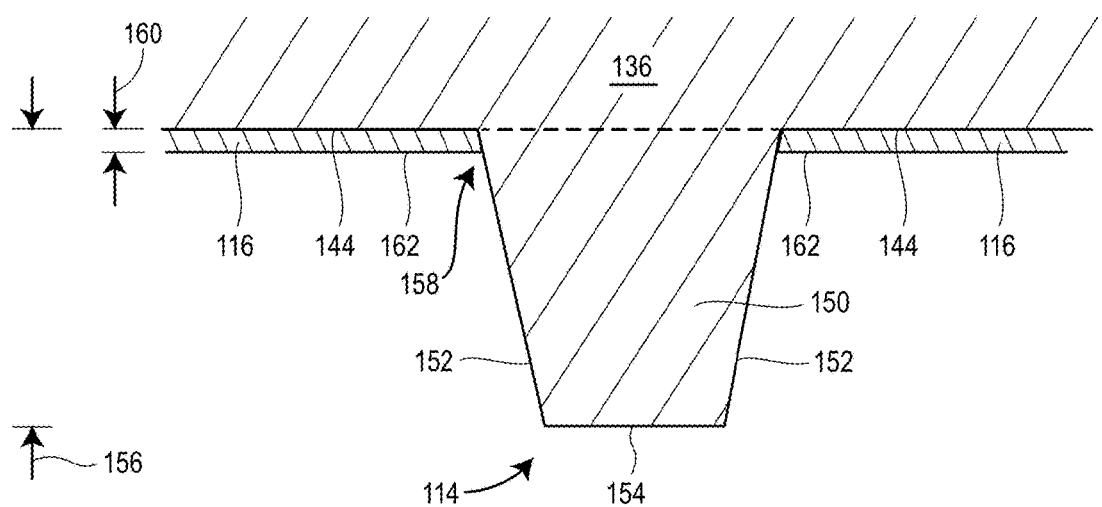
FIG. 5 is an expanded sectional view of a portion of the outsole, illustrating a material in accordance with the present disclosure secured to a backing plate adjacent to a traction element (e.g., a cleat)

FIG. 5 is an expanded sectional view of the material 116 and the ground-facing surface 144 of the outsole or backing plate 136 at one of the traction elements 114. In this shown example, the traction element 114, which can be representative of one or more of the other traction elements 114, is integrally molded with the backing plate 136 and includes a shaft 150 that protrudes downward beyond the ground-facing surface 144 and the material 116. The shaft 150 itself may include an outer side surface 152 and a terminal edge 154. The terminal edge 154 of the shaft 150 is the distal end of the traction element 114, opposite from the ground-facing surface 144, and is the portion of the traction element 114 that can initially contact and penetrate into a playing or ground surface.

As mentioned above, the traction element 114 may have any suitable dimensions and shape, where the shaft 150 (and the outer side surface 152) can correspondingly have rectangular, hexagonal, cylindrical, conical, circular, square, triangular, trapezoidal, diamond, ovoid, as well as other regular or irregular shapes (e.g., curved lines, C-shapes, etc. . . . ). Similarly, the terminal edge 154 can have dimensions and sizes that correspond to those of the outer side surface 152, and can be substantially flat, sloped, rounded, and the like. Furthermore, in some aspects, the terminal edge 154 can be substantially parallel to the bottom surface 144 and/or the material 114.

Examples of suitable average lengths 156 for each shaft 150 relative to bottom surface 144 range from 1 mm to 5 mm, from 5 mm to 10 mm or from 10 mm to 15 mm, where, as mentioned above, each traction element 114 can have different dimensions and sizes (i.e., the shafts 150 of the various traction elements 114 can have different lengths).

In the example shown in FIGS. 1-5, the material 116 is present on the entire ground-facing surface 144 of the backing plate 136 (or outsole) between (but not including) the traction elements 114. For instance, as shown in FIG. 5, the material 116 can cover the ground-facing surface 144 at locations around the shaft 150 of each traction element 114, such that material 116 does not cover the outer side surface 152 or the terminal edge 154 of the traction element 114, other than optionally at a base region 158 of the shaft 150. This can preserve the integrity of the material 116 and preserve traction performance of the traction elements 114. In some aspects, the material 116 does not cover or contact any portion of the outer side surface 152 of the shaft 150. In other aspects, the base region 158 that the material 116 covers and contacts the outer side surface 152 is less than 25%, less than 15%, or less than 10% of the length of the shaft 150, as an average distance measured from the bottom surface 144 at the traction element 114.

As can be seen in FIG. 5, the material 116 can be present as a thin layer (thin relative to the length of the shaft of the traction element 114) to minimize or otherwise reduce its impact on the traction elements 114. Examples of suitable average thicknesses for the material 116 range from about 0.0025 mm, about 0.025 mm, or about 0.1 mm to about 0.15 mm, about 0.25 mm, about 0.35 mm, about 0.5 mm, about 1.0 mm, about 5.0 mm, or about 12 mm. The terms "about" and "substantially" are used herein with respect to measurable values and ranges due to expected variations known to those skilled in the art (e.g., limitations and variability in measurements). The thickness of the layer of the material 116 as present on the outsole can range from about 0.1 mm to about 12 mm, or from about 0.5 mm to about 10 mm, or from about 1 mm to about 7 mm. As depicted, the thicknesses for the material 116 are measured between the interfacial bond at the bottom surface 144 of the backing plate 136 and an exterior surface of the material 116 (referred to as a material surface 162).

In some alternative aspects, the material 116 can also (or alternatively) be present on one or more regions of the traction elements 114. This can be beneficial, for example, in applications where the traction element 114 has a central base with multiple shafts 150 that protrude from the periphery of the central base, such as is found on some types of spikes used on golf shoes. In such aspects, the material 116 can be present on at least the central base of the traction element 114. For example, when the multiple shafts 150 of the fraction element are configured to be ground-contacting during wear, but the central base of the traction element is ground-facing but not configured to be ground-contacting during wear, the material 116 can be present on only the central base of the traction element, and not on the multiple shafts 150 of the traction elements. Furthermore, for some applications, the material 116 may also cover the entirety of one or more of the traction elements 114 (e.g., on the shaft 150). Alternatively, the traction elements 114 can be free of the material.

The presence of the material 116 on the ground-facing side of outsole 112 (i.e., on bottom surface 144) allows the material 116 to come into contact with soil (e.g., mud) during use, which is believed to enhance the soil-shedding performance for the footwear 100, as explained herein. However, the material 116 can also optionally be present on one or more locations of the sidewall 146 of the outsole or backing plate 136, on one or more locations of an included midsole (not shown), on one or more locations on the upper 110, and combinations thereof.

In some aspects, when the material is present in the form of an open-cell foam, the material 116 can take up water that is in contact with the material 116. For instance, the material 116 may take up water from mud, wetted soil, and wet grass, such as during a warm up prior to a competitive match, as well as during a competitive match. The terms "take up," "taking up," "uptake," "uptaking," "absorb", "re-absorb" and the like means the material can draw a liquid (e.g., water) from an external source, such as by absorption, adsorption, capillary action, and combinations thereof. Furthermore, the term "water" refers to an aqueous liquid that can be pure water, or can be an aqueous carrier with lesser amounts of dissolved, dispersed or otherwise suspended materials (e.g., particulates, other liquids, and the like).

The amount of water that the material 116 can take up depends on a variety of factors, such as its composition (e.g., its relative hydrophobicity or hydrophilicity), its cross-linking density, its thickness, and its interfacial bond to the backing plate 136. In addition, the presence of larger pore sizes on the surface of an open-cell foam can increase the amount of surface water available. This can be achieved through foam processing parameters (e.g., the amount of blowing agent, processing temperature or pressure) or through post-processing (e.g., roll milling or needle puncturing.).

Foams of low density are highly compliant and compressible. The term "compliant" refers to the stiffness of a material, and can be determined by Young's modulus. The lower the degree of crosslinking in a material, or the greater the distance between crosslinks in a material, the more compliant the material. In addition, the use of an open-cell foam (as material 116, for example) allows for macroscopic uptake of water into the surface pores. The compliance, and surface water, and water present in the pores of the open-cell foam accordingly can allow the material 116, when in open-cell foam form, to readily compress under an applied pressure (e.g., during a foot strike on the ground), which compression can quickly expel at least a portion of its retained water (depending on the extent of compression). While not wishing to be bound by theory, it is believed that this combination of compressive compliance and water expulsion can disrupt the adhesion and cohesion of soil at outsole 112, which prevents or otherwise reduces the accumulation of soil on outsole 112.

In addition to expelling water, the compressed material 116, when present in the form of an open-cell foam, may also re-absorb water when the compression is released (e.g., liftoff from a foot strike during normal use). As such, during use in a moisture-containing environment (e.g., a muddy or wet ground), the material 116, when present in the form of an open-cell foam, can be dynamically expelling and re-absorbing water over successive foot strikes. This can accordingly allow the open-cell foam material 116 to continue to prevent soil accumulation over extended periods of time (e.g., during an entire competitive match) so long as there is ground water available for re-absorption.

FIGS. 6 to 9 illustrate an example method of using footwear 100 with a muddy or wet ground 166, which depict the believed mechanism for preventing soil accumulation on the outsole 112. It is known that the soil of the ground 166 can accumulate on an outsole (e.g., between the traction elements) during normal athletic or casual use, in particular when the ground 166 is wet. The soil is believed to accumulate on the outsole due to a combination of adhesion of the soil particles to the surface of the outsole and cohesion of the soil particles to each other. In order to break these adhesive/cohesive forces, the soil particles need to be subjected to stresses high enough to exceed their adhesive/cohesive activation energies. When this is achieved, the soil particles can then move or flow under the applied stresses, which dislodge or otherwise shed portions of the soil from the outsole.

However, during typical use of conventional cleated footwear, such as during competitive sporting events (e.g., global football/soccer matches, golfing events, and American football games), the actions of walking and running are not always sufficient to dislodge the soil from the outsole. This can result in the soil sticking to the outsoles, particularly in the interstitial regions between the individual traction elements. As can be appreciated, this soil can quickly accumulate to increase the weight of the footwear and reduce the effectiveness of the fraction elements (e.g., because they have less axial or normal extent capable of engaging with the ground 166), each of which can have a significant impact on athletic performance.

Figure 6:
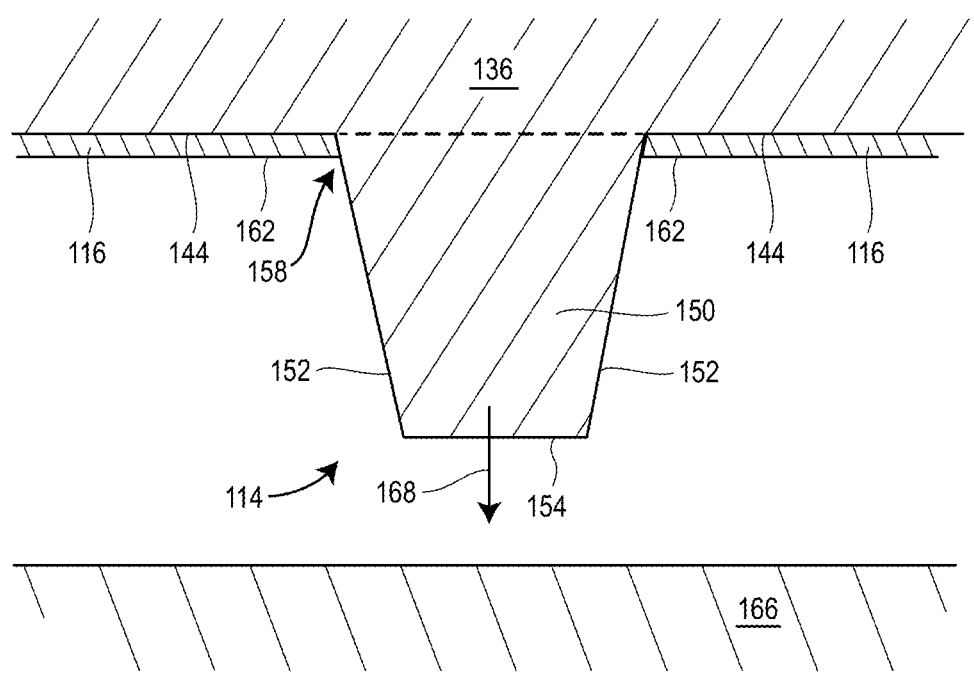
FIGS. 6-9 are expanded sectional views of the portion of the outsole shown in FIG. 5, illustrating the soil-shedding performance of the outsole during a foot strike motion on an unpaved surface.

The incorporation of the (polymeric) material 116 to the outsole 112, however, is believed to disrupt the adhesion and cohesion of soil at the outsole 112, thereby reducing the adhesive/cohesive activation energies otherwise required to induce the flow of the soil particles. As shown in FIG. 6, when the material is in the form of an open-cell foam, the footwear 100 can be provided in a pre-conditioned state where water is present in the open-cells of the foam material 116. This can be accomplished in a variety of manners, such as spraying the outsole 112 with water, soaking the outsole 112 in water, or otherwise exposing the material 116 to water in a sufficient amount for a sufficient duration. Alternatively (or additionally), when water or wet materials are present on the ground 166, footwear 100 can be used in a conventional manner on the ground 166 until the material 116 takes up a sufficient amount of water from the ground 166 or wet materials to reach its pre-conditioned state.

Figure 7:
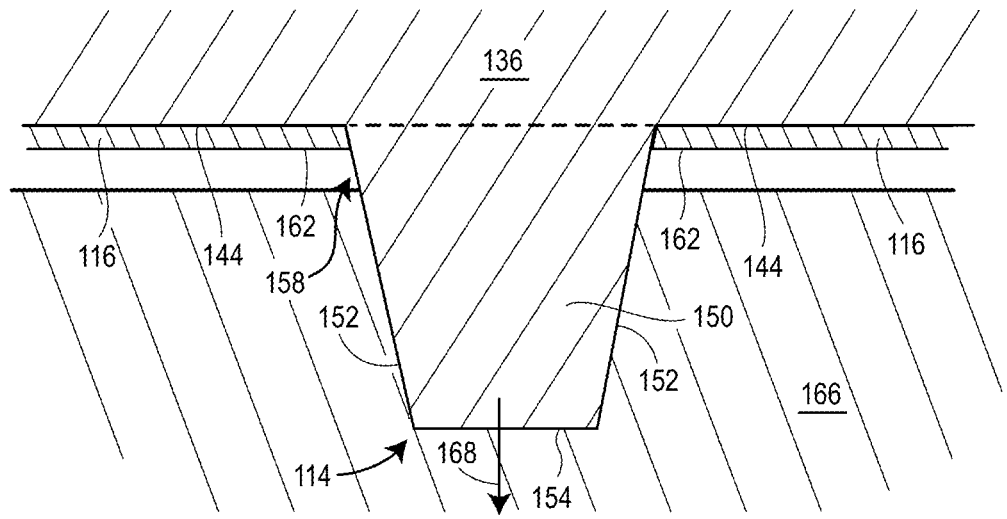
Figure 8:
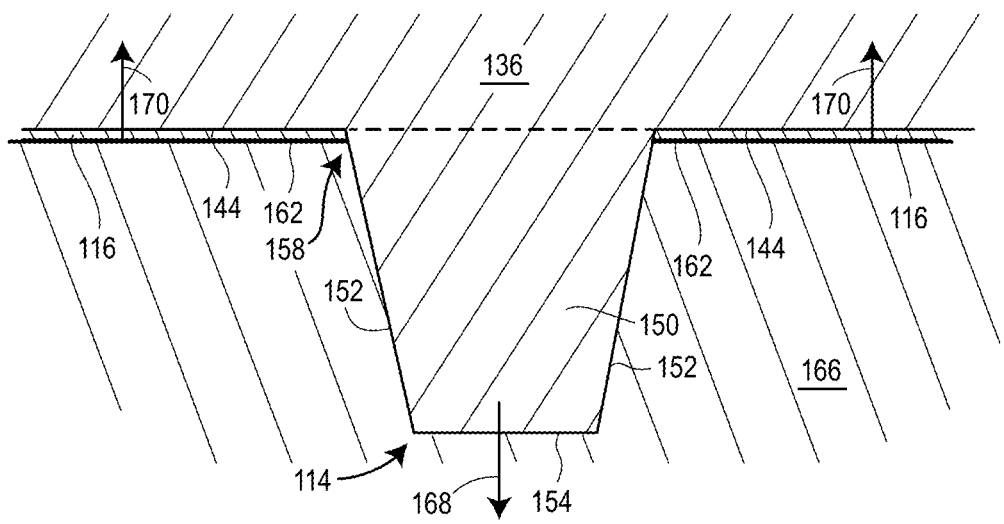

During a foot strike, the downward motion of the footwear 100 (illustrated by arrow 168) causes the fraction element 114 to contact the ground 166. As shown in FIG. 7, the continued applied pressure of the foot strike can cause the traction element 114 to penetrate into the softer soil of the ground 166 until the material surface 162 of the material 116 contacts the ground 166. As shown in FIG. 8, further applied pressure of the foot strike can press the material 116 into the ground 166, thereby at least partially compressing the material 116 under the applied pressure (illustrated by arrows 170). As can be seen, this compression of the material 116 into the soil of the ground 166 typically compacts the soil, increasing the potential for the soil particles to adhere to outsole 112 and to cohesively adhere to each other (clumping together).

Figure 9:
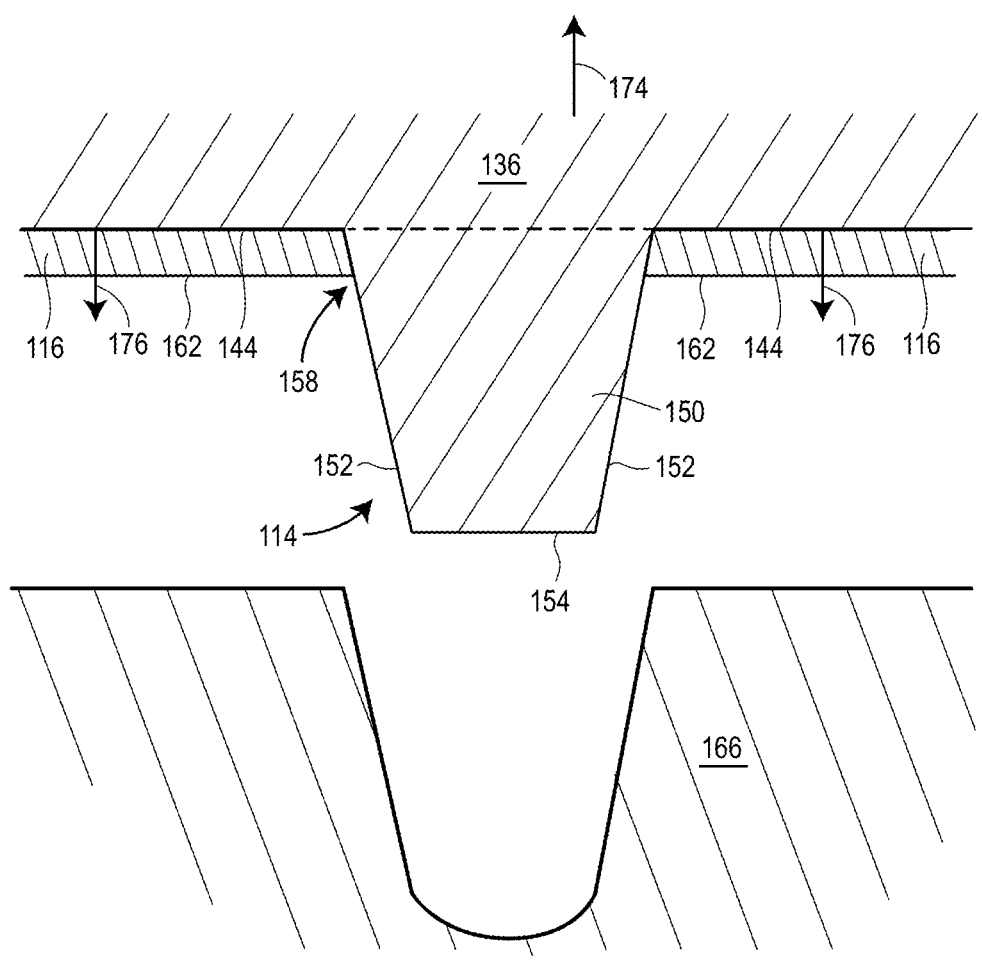

As shown in FIG. 9, when the footwear 100 is lifted following the foot strike (illustrated by arrow 174), it is believed that the compression applied to the material 116 is released, and so the material 116 can be free to expand to its pre-compression thickness. In some examples, it has been found that, when the outsole 112 is lifted apart from the ground 166, a thin water layer can remain in contact with the material surface 162, which can be taken back up into the open-cell foam material 116. This re-uptake of water from the open-cell foam material surface 162 (after compression is removed (e.g., within about 1, 2, or 5 seconds)) can be taken back into the open-cell foam material 116.

This cyclic compression and expansion from repeated, rapid, and/or forceful foot strikes during use of the footwear 100 can also mechanically disrupt the adhesion of any soil still adhered to the material surface 162, despite the presence of the material 116 in a relatively thin layer. In particular, the increased compliance is believed, under some conditions, to lead to inhomogeneous shear states in the soil when compressed in the normal or vertical direction, which can also lead to increased interfacial shear stresses and a decrease in soil accumulation.

Figure 10:
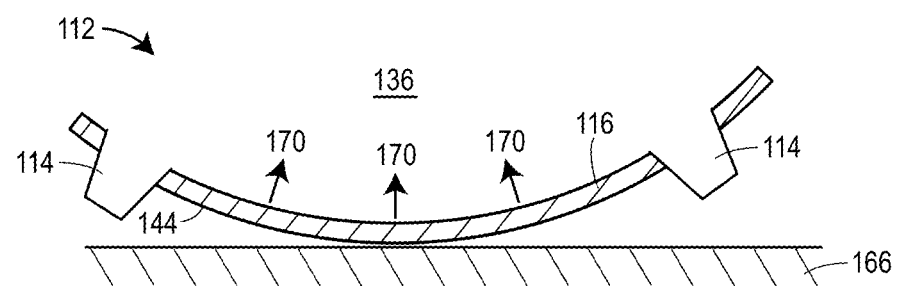
FIG. 10 is a side cross-sectional view of an outsole in an aspect according to the disclosure including a soil-shedding material and soil being shed therefrom, during impact with a ground surface.

In addition to the absorption, compression, and reabsorption cycle discussed above, the compliance of the material 116, for example elongational compliance in the longitudinal direction, may allow the material 116 to be malleable and stretchable. For example, as illustrated in FIG. 10, during a foot rotation in a foot strike (e.g., as the foot generally rolls from heel to toe during a stride), the outsole 112 and the material 116 are correspondingly flexed (e.g., inducing compression forces illustrated by arrows 170).

The increased elongation or stretchiness of the material 116 can increase the extent that the material 116 stretches during this flexing, which can induce additional shear on any soil adhered to the material surface 162. As illustrated, a rolling ground strike creates a curved outsole 112 and curved compressed layer of the material 116, with the water being expelled therefrom (when present as an open-cell foam) and transverse material 116 stretching forces being induced to pull apart and shed the soil. The compression forces (illustrated by arrows 170) on the material 116, which can help to expel the water (when the material is present as an open-cell foam) are particularly strong at points of contact with the ground 166 and/or where the radius of curvature of the curved outsole 112/curved material 116 is relatively small or at its minimum, and so the inclusion of the material 116 in these locations can help to keep at least these portions of the outsole clear of soil during wear.

In addition to being effective at preventing soil accumulation on the outsole, the material 116 has also been found to be sufficiently durable for its intended use on the ground-contacting side of the outsole 112. Durability is based on the nature and strength of the interfacial bond of the material 116 to the bottom surface 144 of the backing plate 136, as well as the physical properties of the material 116 itself. For many examples, during the useful life of the outsoles and/or articles of footwear, the material 116 will not delaminate from the backing plate 136, and it is substantially abrasion- and wear-resistant (e.g., maintaining its structural integrity without rupturing or tearing). In various aspects, the useful life of the material 116 (and the outsole 112 and footwear 100 containing it) is at least 10 hours, 20 hours, 50 hours, 100 hours, 150 hours, or 200 hours of wear. For example, the useful lifetime of the material 116 can be from 10 hours to 200 hours of wear. In other applications, the useful lifetime of the material 116 can be from 20 hours to 150 hours of wear. In further applications, the useful lifetime of the material can be from 50 to 150 hours of wear. In many aspects, the outsoles and articles of footwear of the present disclosure retain their soil-shedding ability for the useful lifetime.

Figure 11:
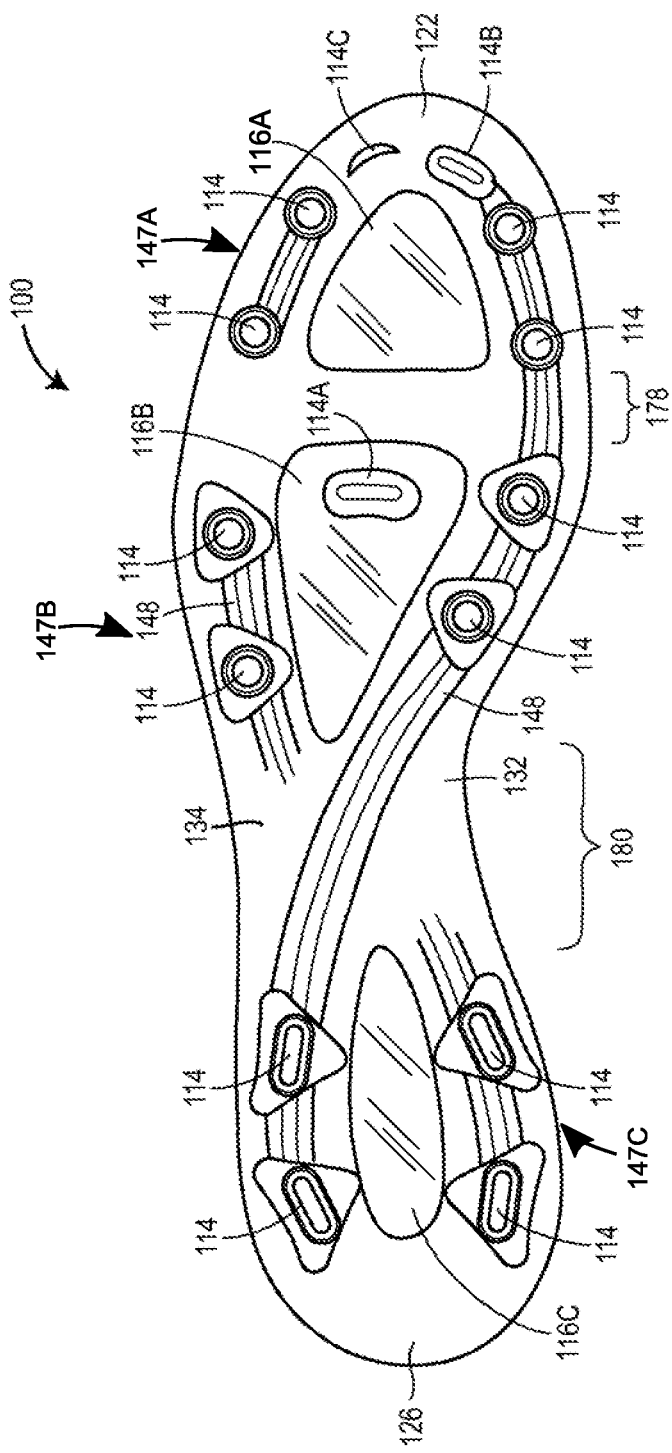
FIG. 11 is a bottom view of an article of footwear in another aspect of the present disclosure having an outsole including a material in accordance with the present disclosure, the material having discrete and separate sub-segments.

While the material 116 is illustrated above in FIGS. 1-4 as extending across the entire bottom surface 144 of the outsole 112 of the footwear 100, in alternative aspects, the material 116 can alternatively be present as one or more segments that are present at separate, discrete locations on the bottom surface 144 of the outsole 112. For instance, as shown in FIG. 11, the material 116 can alternatively be present as a first segment 116A secured to the bottom surface 144 at the forefoot region 122, such as in the interstitial region between the traction elements 114 of cluster 147A; a second segment 116B secured to the bottom surface 144 at the midfoot region 124, such as in the interstitial region between the fraction elements 114 of cluster 147B; and/or a third segment 116C secured to the bottom surface 144 at the heel region 126, such as in the interstitial region between the fraction elements 114 of cluster 147C. In each of these examples, the remaining regions of the bottom surface 144 can be free of the material 116.

In some arrangements, the material 116 may include one or more segments secured to the bottom surface 144 at a region 178 between the clusters 147A and 147B, at a region 180 between the clusters 147B and 147C, or both. For example, the material 116 may include a first segment present on the bottom surface 144 that encompasses the locations of segment 116A, the region 178, and segment 116B as well at the location of region 178; and a second segment corresponding to the segment 116B (at the cluster 147C). As also shown in FIG. 11, the segments of the material 116 (e.g., segments 116A, 116B, and 116C) can optionally have surface dimensions that conform to the overall geometry of the backing plate 136, such as to conform to the contours of the ridges 148, the fraction elements 114, and the like.

In another arrangement, the bottom surface 144 may include a front edge region 182 between the front edge 128 and the cluster 147A (and optionally include a front portion of the cluster 147A) that is free of the material 116. For some uses, soil accumulation is typically most prominent in the interstitial regions of the clusters 147A, 147B, and 147C, in comparison to the front edge 128.

Figure 12:
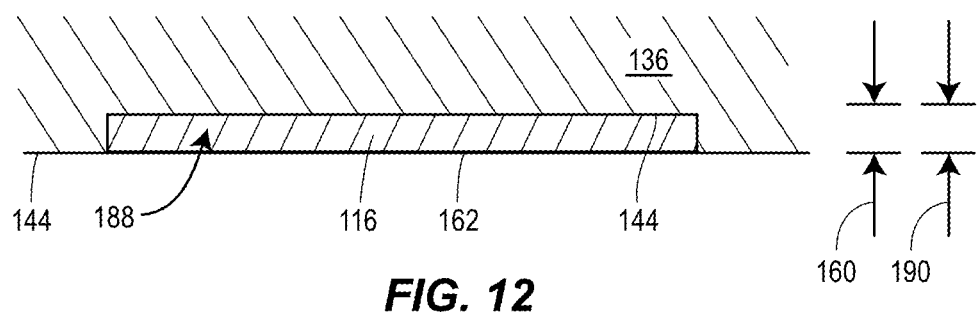
FIG. 12 is an expanded sectional view of a portion of an outsole in another aspect of the present disclosure, which includes a material in accordance with the present disclosure, the material being present in a recessed pocket of an outsole backing plate.

Furthermore, the backing plate 136 can also include one or more recessed pockets, such as a pocket 188 shown in FIG. 12, in which the material 116 or a sub-segment of the material 116 can reside. This can potentially increase the durability of the material 116 by protecting it from lateral delamination stresses. For instance, the backing plate 136 can include a pocket 188 in the interstitial region of cluster 147C, where the sub-segment 116C of the material 116 can be secured to the bottom surface 144 within the pocket 188. In this case, the dry-state thickness 160 of the material 116 can vary relative to a depth 190 of the pocket 188.

Figure 13:
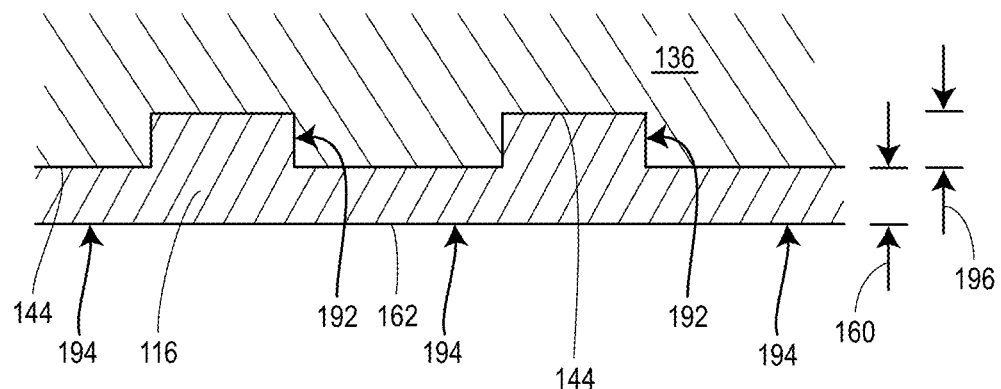
FIG. 13 is an expanded sectional view of a portion of an outsole in another aspect of the present disclosure, which includes an outsole backing plate having one or more indentations, and a material in accordance with the present disclosure, the material being present in and over the indentations.

In some aspects, the depth 190 of the pocket 188 can range from 80% to 120%, from 90% to 110%, or from 95% to 105% of the dry-state thickness 160 of the material 116. Moreover, in aspects in which the backing plate 136 includes multiple pockets 188, each pocket 188 may have the same depth 190 or the depths 190 may independently vary as desired. FIG. 13 illustrates an alternative design for the engagement between the material 116 and the bottom surface 144. In this case, the backing plate 136 can include one or more recessed indentations 192 having any suitable pattern(s), and in which portions of the material 116 extend into the indentations 192 to increase the interfacial bond surface area between the material 116 and the bottom surface 144 of the backing plate 136. For example, the indentations 192 can be present as one or more geometrically-shaped holes (e.g., circular, rectangular, or other geometric shapes) or irregularly-shaped holes in the backing plate 136, one or more trenches or channels extending partially or fully along the backing plate 136 (in the lateral, longitudinal, or diagonal directions), and the like.

In these aspects, the material 116 can have two (or more) thicknesses depending on whether a given portion of the material 116 extends into one of the indentations. For ease of discussion and readability, the dry-state thickness 160 of the material 116, as used herein, refers to a portion of the material 116 (in a dry state) that does not extend into one of the indentations, such as at locations 194. As such, the dry-state thickness 160 shown in FIG. 13 is the same as the dry-state thickness 160 shown above in FIG. 5.

Figure 14:
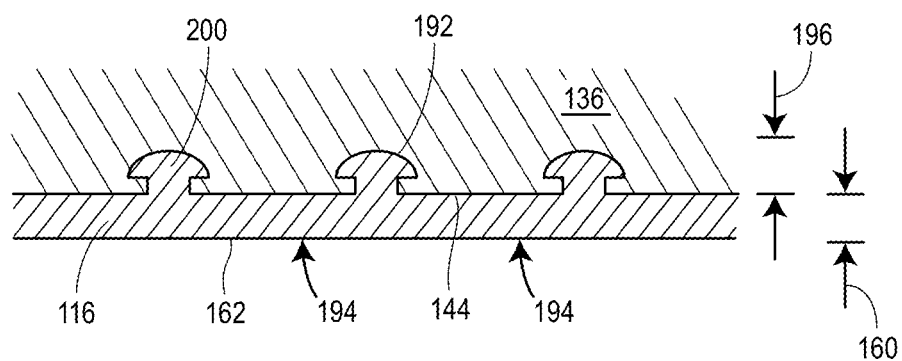
FIG. 14 is an expanded sectional view of a portion of an outsole in another aspect of the present disclosure, which includes an outsole backing plate having one or more indentations having locking members, and a material in accordance with the present disclosure, the material being present in and over the indentations.

Each indentation 192 may independently have a depth 196, which can range from 1% to 200%, from 25% to 150%, or from 50% to 100% of the dry-state thickness 160 of the material 116. In these locations, the dry-state thickness of the material 116 is the sum of the dry-state thickness 160 and the depth 196. FIG. 14 illustrates a variation on the indentations 192 shown above in FIG. 13. In the design shown in FIG. 14, the indentations 192 can also extend in-plane with the backing plate 136 to form locking members 200 (e.g., arms or flanged heads). This design can also be produced with co-extrusion or injection molding techniques, and can further assist in mechanically securing the material 116 to the backing plate 136.

As discussed above, the outsole 112 with the material 116 is particularly suitable for use in global football/soccer applications. However, the material 116 can also be used in combination with other types of footwear 100, such as for articles of footwear 100 for golf (shown in FIG. 15), for baseball (shown in FIG. 16), and for American football (shown in FIG. 17), each of which can include traction elements 114 as cleats, studs, and the like.

Figure 15:
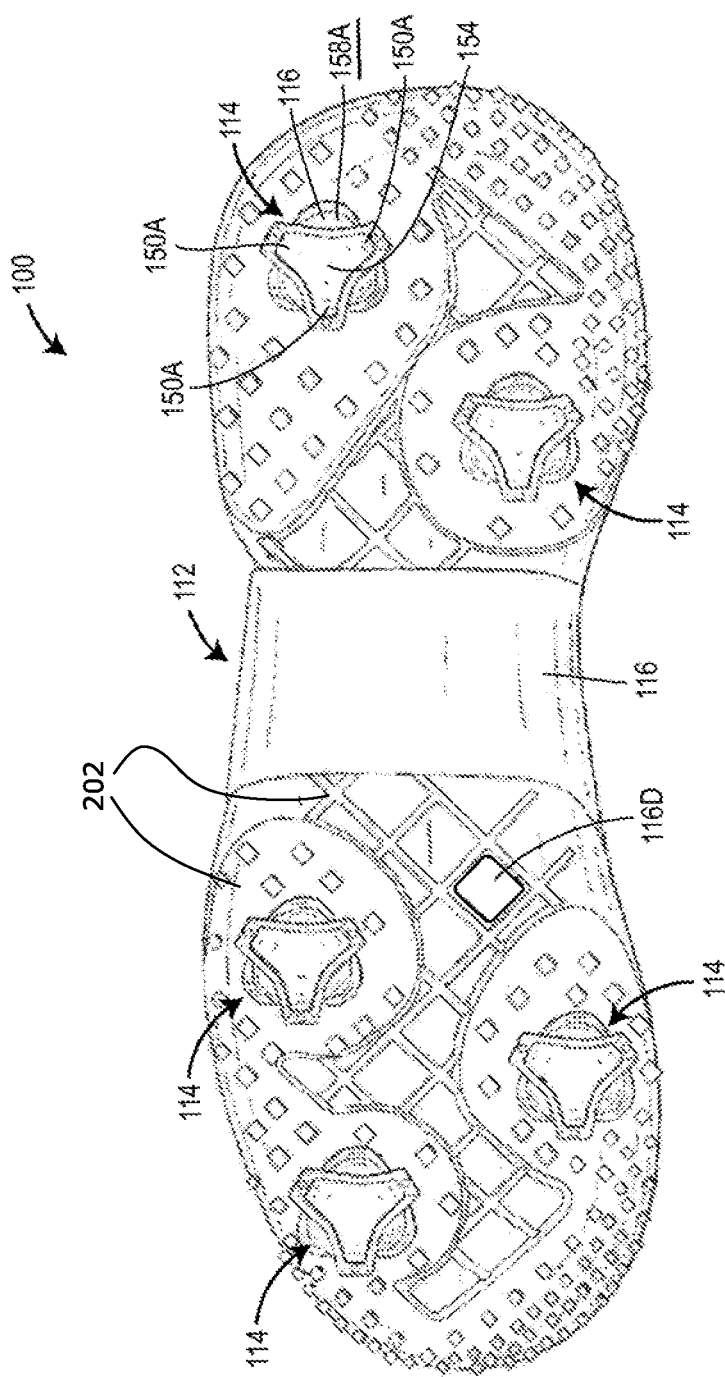
FIG. 15 is a bottom view of an article of footwear in another aspect of the present disclosure, which illustrates an example golf shoe application.

FIG. 15 illustrates an aspect in which the material 116 is positioned on one or more portions of the outsole 112 and/or cleats 114 in an article of golf footwear 100. In some cases, the material 116 is present on one or more locations of the ground-facing surface of the outsole 112 except the cleats 114 (e.g., a non-cleated surface, such as generally illustrated in FIG. 1 for the global football/soccer footwear 100). Alternatively or additionally, the material 116 can be present as one or more film segments 116D on one or more surfaces between tread patterns 202 on ground-facing surface of the outsole 112. Alternatively or additionally, the material 116 can be incorporated onto one or more surfaces of the cleats 114. For example, the material 116 can also be on central region of cleat 114 between the shafts/spikes 150A, such as where each cleat 114 is screwed into or otherwise mounted to the outsole 112 backing plate 136, and has a generally flat central base region 158A (i.e., where the material 116 is located) and three shafts/spikes 150A arranged around the perimeter of the central region 158A. In such aspects, remaining regions of the outsole 112 can be free of the material 116. For example, the cleats 114 having material 116 can be separate components that can be secured to the outsole 112 (e.g., screwed or snapped in), where the outsole 112 itself can be free of the material 116. In other words, the material-covered cleats 114 can be provided as components for use with standard footwear not otherwise containing the 116 (e.g., golf shoes or otherwise).

Figure 16:
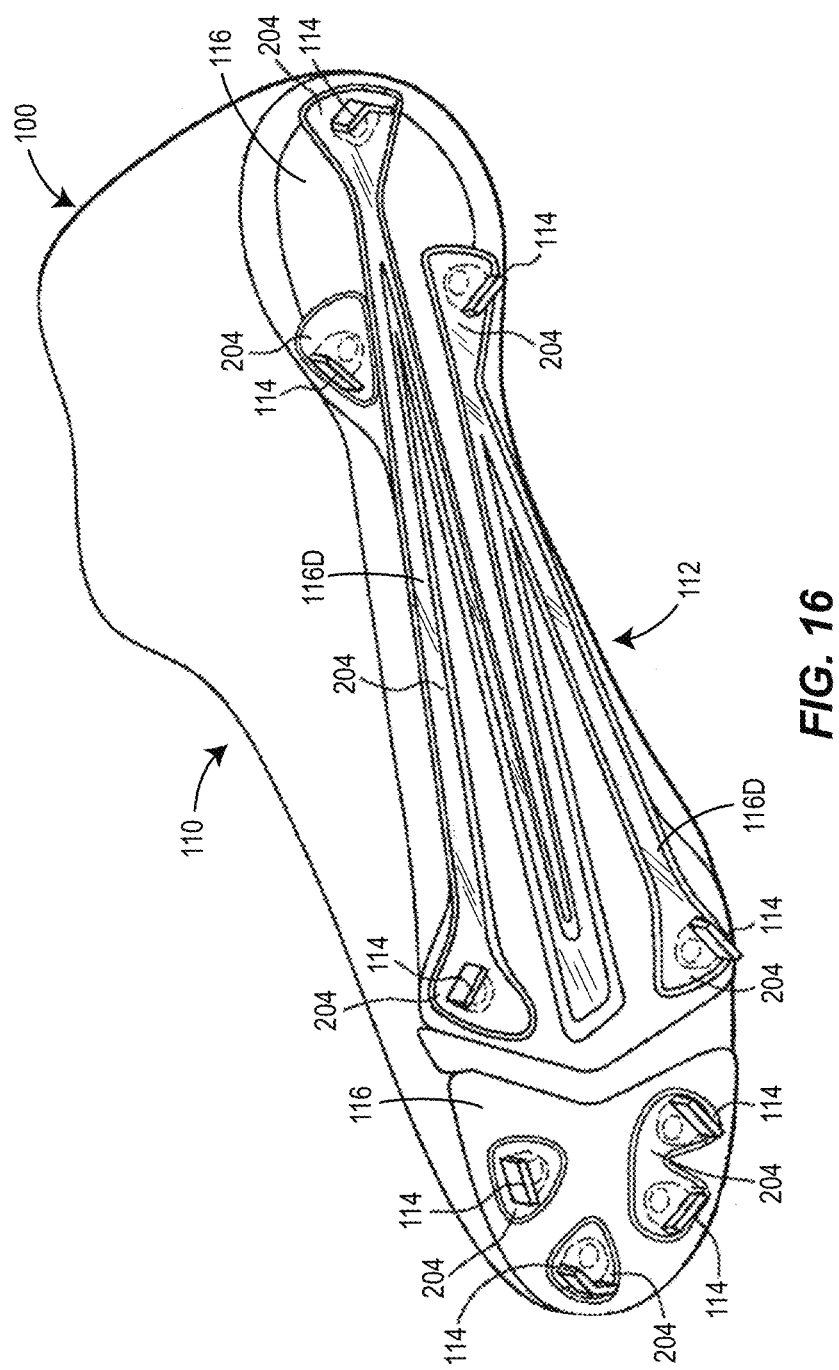
FIG. 16 is a bottom perspective view of an article of footwear in another aspect of the present disclosure, which illustrates an example baseball shoe application.

FIG. 16 illustrates an aspect in which the material 116 is positioned on one or more portions of the outsole 112 in an article of baseball footwear 100. In some cases, the material 116 is present on one or more locations of the ground-facing surface of the outsole 112 except the cleats 114 (e.g., a non-cleated surface, such as generally illustrated in FIG. 1 for the global football/soccer footwear 100). Alternatively or additionally, the material 116 can be present as one or more film segments 116D on one or more recessed surfaces 204 in the ground-facing surface of the outsole 112, which recessed surfaces 204 can include the cleats 114 therein (e.g., material 116 is located only in one or more of the recessed surfaces 204, but not substantially on the cleats).

Figure 17:
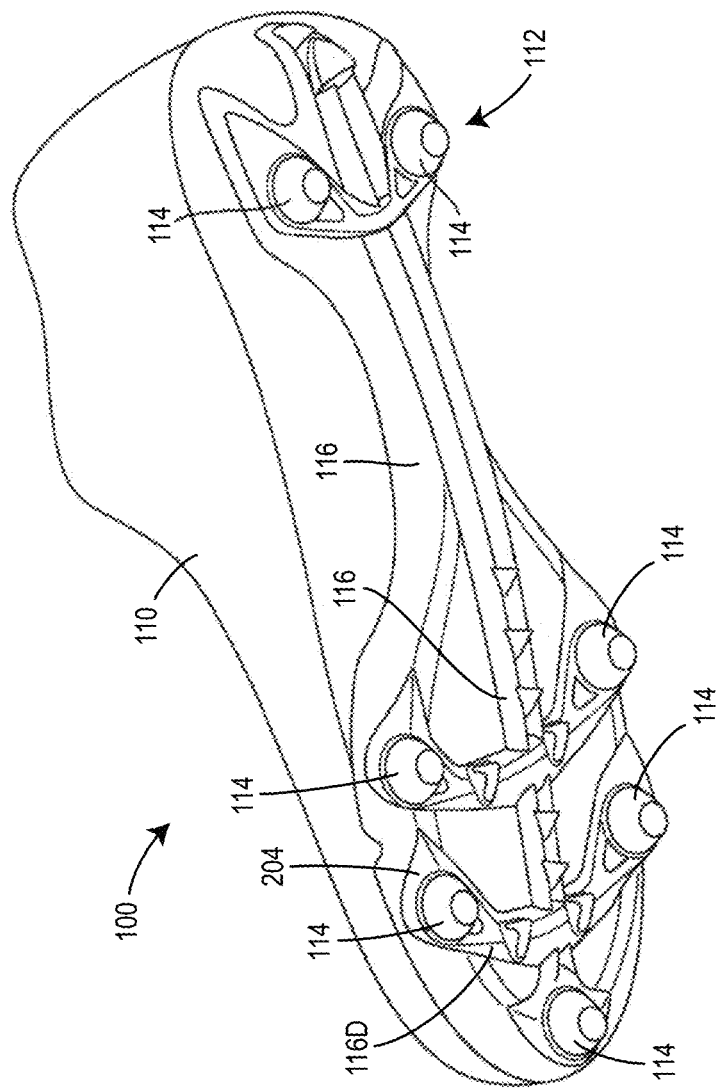
FIG. 17 is a bottom perspective view of an article of footwear in another aspect of the present disclosure, which illustrates an example American football shoe application.

FIG. 17 illustrates an aspect in which the material 116 is positioned on one or more portions of the outsole 112 in an article of American football footwear 100. In some cases, the material 116 is present on one or more locations of the ground-facing surface of the outsole 112 except the cleats 114 (e.g., a non-cleated surface, such as generally illustrated in FIG. 1 for the global football/soccer footwear 100). Alternatively or additionally, the material 116 can be present as one or more film segments 116D on one or more recessed surfaces 204 in the ground-facing surface of the outsole 112, which recessed surfaces 204 can include the cleats 114 therein (e.g., material 116 is located only in one or more of the recessed surfaces 204, but not substantially on the cleats).

Figure 18:
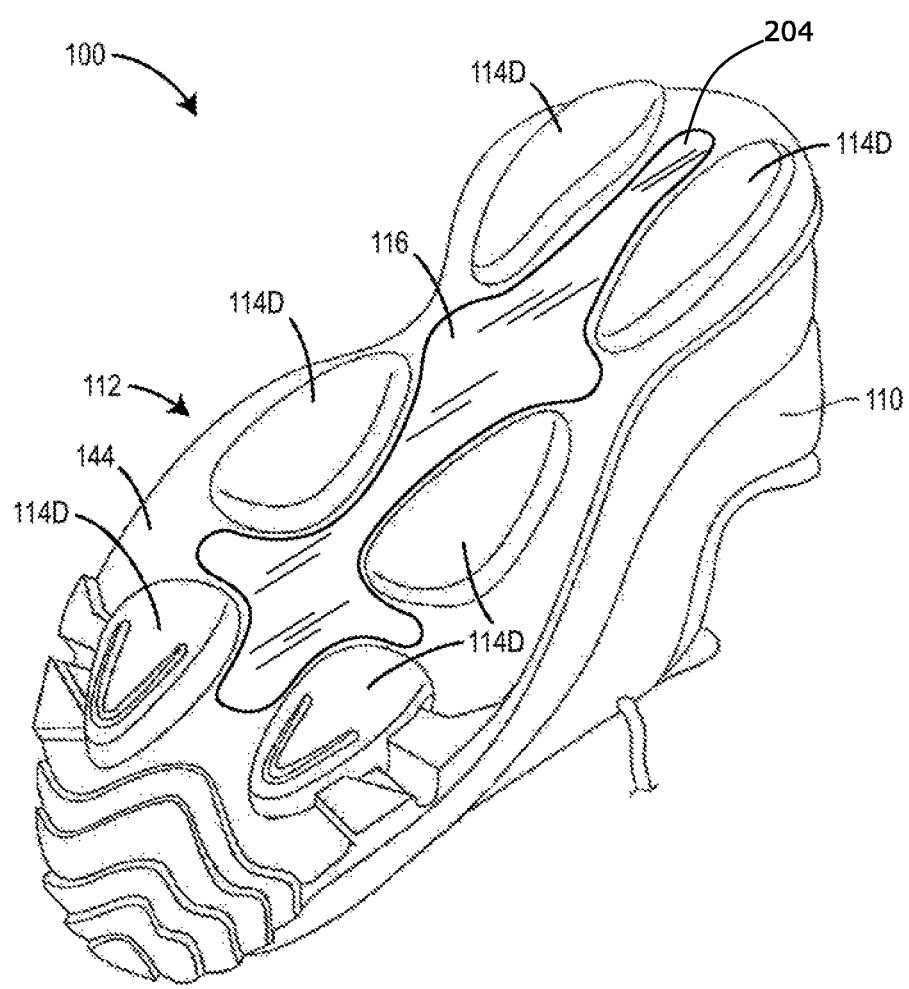
FIG. 18 is a bottom perspective view of an article of footwear in another aspect of the present disclosure, which illustrates an example hiking shoe application; and, FIGS. 19A and 19B are photographs of articles of footwear with a material according to the disclosure after being worn and used during wet and muddy game conditions.

FIG. 18 illustrates an aspect in which the material 116 is positioned on one or more portions of the outsole 112 in an article of hiking footwear 100 (e.g., hiking shoes or boots). As illustrated, the traction elements 114 are in the form of lugs 114D which are integrally formed with and protrude from the outsole 112 bottom surface 144. In some cases, the material 116 is present on one or more locations of the bottom surface 144 of the outsole 112 except the lugs 114D. For example, the material 116 can be located on recessed surfaces 204 between adjacent lugs 114D (e.g., but not substantially on the 114D).

The foregoing discussions of footwear 100 and outsole 112 have been made above in the context of footwear having traction elements (e.g., traction elements 114), such as cleats, studs, spikes, lugs, and the like. However, footwear 100 having material 116 can also be designed for any suitable activity, such as running, track and field, rugby, cycling, tennis, and the like. In these aspects, one or more segments of the material 116 are preferably located in interstitial regions between the traction elements, such as in the interstitial grooves of a running shoe tread pattern.

The outsoles and/or articles of footwear of the present disclosure, including the material present on (secured to) the outsoles and/or articles of footwear described herein, can be characterized based on various properties, for example, soil shedding ability, water uptake, durability, melt flow rate, density, and/or various dynamic mechanical properties.

The material can be characterized by its ability to shed soil as determined by the impact energy required to dislodge soil from a sample of material, and as measured according to the Impact Energy Test disclosed herein. The material can be tested either in neat material form or on a test sample taken from an outsole in accordance with the Sampling Procedures disclosed herein. As shown in Table I (below), when tested according to the Impact Energy Test, the impact energy required to dislodge soil from a sample of a material according to the present disclosure was 0 Joules (i.e., the soil did not adhere to the sample). In comparison, the impact energy required to dislodge soil from a sample of a material not in accordance with the present disclosure (and having a thickness of 0.7 mm) was 0.55 Joules. Further, the impact energy required to dislodge soil from another sample of a material not in accordance with the present disclosure (and having a thickness of 0.9 mm) was 0.36 Joules. Accordingly, in some aspects, the impact energy required to dislodge soil from the material disclosed herein can range from 0 Joules to 0.6 Joules, from 0 Joules to 0.4 Joules, from 0 Joules to 0.2 Joules, or from 0.2 Joules to 0.4 Joules.

The ability of the material to take up water can reflect its ability prevent soil accumulation during use with an article of footwear (e.g., footwear 100). As discussed above, in some aspects when the material is present as an open-cell foam, it can take up u water. When the material is then subjected to an application of pressure, either compressive or flexing, the material can reduce in volume to expel at least a portion of its water.

This expelled water is believed to reduce the adhesive/cohesive forces of soil particles at the outsole, which taken alone, or more preferably in combination with the material compliance, can prevent or otherwise reduce soil accumulation at the outsole. Accordingly, the material can undergo dynamic transitions during and between foot strikes, such as while a wearer is running or walking.

The material also can be characterized based by the durability of its soil-shedding ability. The durability of the material can be assessed using the Impact Energy Test, before use and after a certain specified period of time of use during normal activity conditions (e.g., in-game use). For example, the impact energy required to shed soil from the material can remain the same as when tested before use or vary by less than 10% of the impact energy required to dislodge soil before use and following 90 minutes, 10 hours, 20 hours, 40 hours, 80 hours, 100 hours, or 200 hours (e.g., at least 80-100 hours) of game play, as characterized by the Impact Energy Test using the Footwear Sampling Procedure.

The material, as well as components of the material, can be characterized based on melt flow rate. The melt flow rate melt flow rate of the material can be determined according to ASTM D1238 using a 2160 g weight and a temperature of 190° C. The melt flow rate of the material, according to ASTM D1238 using a 2160 g weight and a temperature of 190° C., can be from 0.4 g/10 mins. to 125 g/10 mins., or from 0.5 g/10 mins. to 100 g/10 mins.

The material can be characterized based on its density. The density of the material can be determined using standard gravimetric and volumetric procedures. The density of the material can be from 0.5 lbs./ft.$^3$ to 5 lbs./ft.$^3$, or from 1 lb./ft.$^3$ to 3.5 lbs./ft.$^3$.

The material can be characterized based on its tensile strength. The tensile strength of the material can be determined on standard tensile specimens of the material using a standard method such as ASTM D882. The tensile strength of the material, according to ASTM D882, can be from 75 kPa to 250 kPa, or from 100 kPa to 200 kPa.

The material can be characterized based on its Young's modulus (i.e., tensile modulus). The Young's modulus of the material can be calculated by dividing the tensile stress by the extensional strain of the material, which can be obtained from a stress-strain curve for the material as determined using standard procedures. The Young's modulus of the material can be from 0.4 MPa to 2.5 MPa, or from 0.5 MPa to 2 MPa.

The material 116 is composed of a polymer material that optionally can be formulated with an agent for cross-linking and optionally can be foamed. The material can comprise a blend of polymers and optionally non-polymeric materials. The material is described in U.S. Pat. No. 8,853,289, the disclosure of which is incorporated herein by reference. Therein the material is described in the context of cleaning up oil spills. There is no disclosure, teaching, or suggestion therein, however, that the material can be used in the manner now discovered as an article of footwear or a component of an article of footwear. The material is believed to be commercially available from OPFLEX Technologies LLC (Indianapolis, Ind.), the assignee of the '289 patent.

In some aspects, the material is low or medium density polyethylene in combination with (e.g., blended with) an ethylene alkyl acrylate copolymer or a combination of alkyl acrylate copolymers. In one aspect, the ethylene alkyl acrylate copolymer is selected from the group consisting of ethylene-methyl acrylate, ethylene-ethyl acrylate, and mixtures thereof. These materials have a density ranging from about 0.85 to about 0.95. Specifically, elastomers, such as polyolefin elastomers and ethylene-styrene copolymers have a density of about 0.85, and a melting point of about 45° C. Very low density polyethylene has a density of about 0.89, and a melting point of about 93° C. Low density and linear low density polyethylene has a density of about 0.91, and a melting point of about 100° C. Medium density polyethylene has a density of about 0.92, and a melting point of about 112° C. In contrast high density polyethylene has a density of about 0.93, and a melting point of about 120° C.

In one aspect, when the material comprises polyethylene, the polyethylene is selected from polyethylene resins with a density of from about 0.91 grams/cubic centimeter (g/cc) to about 0.950 g/cc, or of from about 0.917 g/cc to about 0.930 g/cc, or from about 0.917 g/cc to about 0.923 g/cc. The material when in the form of a foam (e.g., open-cell foam) can have a foamed density of about 1.5 pounds per cubic foot. The melt flow rate, as determined according to ASTM D1238 using a 2160 g weight and a temperature of 190° C., can be in the range of from about 0.5 g/10 mins. to about 100 g/10 mins., or from about 0.5 g/10 mins. to about 10 g/10 mins., or from about 1 g/10 mins. to about 4 g/10 min. Polyethylene resins suitable for use are commercially available from a variety of manufacturers, such as Nova Chemical, Exxon Mobil, and Westlake Chemical. These resins are believed to be produced using a high pressure polyethylene process normally manufactured on either tubular or autoclave reactors.

The ethylene alkyl acrylate copolymers of the material can be copolymers of ethylene and methyl acrylate or ethyl acrylate or mixtures thereof. These copolymers can have alkyl acrylate content of from about 3% to about 45%, based on the total weight of copolymer. The alkyl acrylate content can be from about 15% to about 25%. The melt flow rate as measured above is similar to the polyethylene melt flow rate. The melt flow rate range can be from about 0.5 g/10 mins. to about 4 g/10 mins.

The material can contain (a) about 20% to about 80% of the copolymer or a combination of two or more copolymers, and (b) about 80% to about 20% of the polyethylene. The range can be about 40% to about 60% copolymer(s), or about 50% to about 60% copolymer(s). The combination also may contain other polymers to enhance properties (e.g., durability). Examples of other polymers include polyethylene, polyethylene acrylate, and ethylene-propylene diene monomer (EPDM). EPDM is a synthetic rubber analog that can enhance the elongational properties (e.g., elongation to yield or break) and, therefore, can enhance durability properties.

An agent suitable to cross-link the polymer (a crosslinking agent) may also be included. Suitable chemical cross-linking agents include organic peroxides, silanes, vinyl monomers, organo-titanates, organo-zirconates, and p-quinone dioximes. One method of cross-linking employs an organic peroxide, examples of which include dicumyl peroxide, 2,5-dimethyl-2,5-di(t-butylperoxy)hexane, 1,1-bis(t-butylperoxy)-3,3,5-trimethylcyclohexane, 1,1-di-(t-butylperoxy)cyclohexane, 2,2'-bis(t-butylperoxy)-diisopropylbenzene, 4,4'-bis(t-butylperoxy)butylvalerate, t-butylperbenzoate, t-butylpaterephthalate, and t-butyl peroxide. Preferably, the peroxide cross-linking agent is dicumyl peroxide or 2,2'-bis(t-butylperoxy)diisopropylbenzene.

The cross-linked polymer optionally can be grafted. Generally, grafting involves attaching monomer(s) or polymer(s) to the original polymer resin chains. Grafting is accomplished by forming active grafting sites on the original polymer chains in the presence of monomers that can further polymerize as branches from the original polymer chains. Active grafting sites can be formed, for example, by free radicals or anions. A graft can include other monomers, such as di- and tri-allyl cyanurates and isocyanurates, alkyl di- and tri-acrylates and methacrylates, zinc dimethacrylates and diacrylates, styrenes, divinylbenzene, vinyl silanes with at least two hydrolysable groups, and butadiene. Silane-grafted polymer materials can be cross-linked by reaction with moisture. The polymer may also be grafted with maleic anhydride to modify the absorption properties.

A polyolefin elastomer optionally may be included in the material. Polyolefin elastomers are modifiers that provide improvements in impact strength and other properties. In one aspect, the polyolefin elastomer is a metallocene polymer, such as Engage™ (available from The Dow Chemical Company (Midland, Mich.)), or equivalent. In an aspect, a portion or all of the ethylene-alkyl acrylate may be replaced with a metallocene polymer.

Unimpregnated polyethylene-polystyrene (UPES) also may be included in the material. UPES is compatible with various polymers and improves processability. UPES may provide additional flexibility, improved melt strength, increased temperature range, density potential, and source reduction.

Chemical foaming agents also may be included in the material in order to form the material into an open-cell foam. Chemical foaming agents may include, for example, azodicarbonamide, p-p'-oxybis(benezene)sulfonyl hydrazide, p-toluenesulfonyl semicarbazide, 5-plienyltetrazole, ethyl-5-phenyltetrazole, dinitrosopentamethylenetetramine, and other azo, N-nitroso, semicarbazide, sulfonyl hydrazides, carbonate, and bicarbonate compounds that decompose to form a gas when heated. Chemical foaming agents, such as azodicarbonamide, can be used. Maleic anhydride can be added to the material to increase the polarity of the material composition to further improve water absorption.

The material also may include additives. Additives may include inert fillers such as calcium carbonate, talc, zinc oxide, or the like. These fillers can serve to lower the ultimate elongation of the foam walls, yielding easier crushing tendency. Silicone oil also can be added to modify the integrity of the cell wall and to create an even cellular structure. In an aspect, zinc stearate may be included to act as a foaming agent activator. In an aspect, stearic acid may be used as a releasing agent. Other additives, alone or in combination, can be added to the foam compositions including antioxidants, ultra-violet stabilizers, thermal stabilizers, antistatic components, flame retardants, dyes, pigments or colorants, and other processing aids.

When present in the form of an open-cell foam, the material has an interconnecting cell structure. In one example, the foam is prepared by mixing the polyethylene and copolymer with a foaming agent, cross-linker and any desired additive. The cross-linker effects cross-linking of the material of polyethylene and copolymer. The mixture is then directed to a mold under high pressure where the mixture is subjected to heat and pressure where the cross-linking is initiated. The mixture then is directed to a second step expansion chamber where it is steam heated and water cooled. In this process, there is no direct contact with the heating and cooling fluids. In this step the foaming agent decomposes into a gas while cross-linking is continued. The foam mixture is then cooled and removed for further processing. The foam is then crushed to puncture its skin and then compressed to break the closed cells. The foam then optionally can be crushed or punctured with needles to increase the number and size of the open cells.

Alternatively, the foam can be continuously produced through extrusion foaming. In such a process, all of the ingredient components are added to an extruder as neat resin/filler or as masterbatches from a previous compounding step. The components form a molten resin that flows through an extruder and later exits through an extrusion die. As the molten resin exits the die a large pressure drop results and acts to separate a gas phase from the solid material. Thereafter, post-processing can be used to alter the skin properties or emboss the material on a macroscale.

The articles of footwear of the present disclosure can be manufactured using a variety of different footwear manufacturing techniques. For example, the material (e.g., material 116) and the optional backing plate or substrate can be formed using methods such as injection molding, cast molding, thermoforming, vacuum forming, extrusion, spray coating, and the like.

In a first aspect, the outsole is formed with the use of a co-extruded outsole plate. In this case, the film material can be co-extruded with a thermoplastic material used to form a thin backing substrate, where the resulting co-extrudate can be provided in a web or sheet form. The web or sheet can then be placed in a vacuum thermoforming tool to produce the three-dimensional geometry of the outsole ground-facing side (referred to as an outsole face precursor). The backing substrate provides a first function in this step by creating a structural support for the relatively thinner and weaker material (e.g. material 116). The outsole face precursor can then be trimmed to form its perimeter and orifices to receive traction elements, thereby providing an outsole face.

The outsole face can then be placed in a mold cavity, where the material is preferably positioned away from the injection sprues. Another thermoplastic material can then be back injected into the mold to bond to the backing substrate, opposite of the material (e.g., material 116). This illustrates the second function of the backing substrate, namely to protect the material (e.g., material 116) from the injection pressure. The injected thermoplastic material can be the same or different from the material used to produce the backing substrate. Preferably, they include the same or similar materials (e.g., both being thermoplastic polyurethanes). As such, the backing substrate and the injected material in the mold form the outsole backing plate, which is secured to the material disclosed herein (e.g., material 116) (during the co-extrusion step).

In a second embodiment, the outsole is formed with the use of injection molding. In this case, a substrate material is preferably injected into a mold to produce the outsole backing plate. The outsole backing plate can then be back injected with the material disclosed herein (e.g., material 116) to produce the material bonded to the outsole backing plate.

In either embodiment, after the outsole is manufactured, it can be directly or indirectly secured to a footwear upper to provide the article of footwear of the present disclosure.

In particular, material disclosed herein (e.g., material 116) can function as a ground-facing surface of the outsole, which is positioned on the opposite side of the outsole backing plate from the upper.

Property Analysis and Characterization Procedures

Various properties can be determined for the material secured to the outsole according to the following methodologies.

The terms "Footwear Sampling Procedure," "Neat Material Sampling Procedure," "Water Uptake Capacity Test," and "Impact Energy Test," as used herein refer to the respective sampling procedures and test methodologies described below. These sampling procedures and test methodologies characterize the properties of the recited materials, outsoles, footwear, and the like, and are not required to be performed as active steps in the claims.

1. Sampling Procedures

As mentioned above, it has been found that when the material is secured to another substrate, the interfacial bond can restrict the extent that the material can take up water. As such, various properties of the material can be characterized using samples prepared with the following sampling procedures:

A. Footwear Sampling Procedure

This procedure can be used to obtain a sample of the material when the material is a component of a footwear outsole or article of footwear (e.g., bonded to an outsole substrate, such as an outsole backing plate). An outsole sample including the material in a non-wetted state (e.g., at 25° C. and 20% relative humidity) is cut from the article of footwear using a blade. This process is performed by separating the outsole from an associated footwear upper, and removing any materials from the outsole top surface (e.g., corresponding to the top surface 142) that can uptake water and potentially skew the water uptake measurements of the outsole film. For example, the outsole top surface can be skinned, abraded, scraped, or otherwise cleaned to remove any upper adhesives, yarns, fibers, foams, and the like that could potentially take up water themselves.

The resulting sample includes the material and any outsole substrate bonded to the material, and maintains the interfacial bond between the material and the associated substrate. As such, this test can simulate how the material will perform as part of an article of footwear. Additionally, this sample is also useful in cases where the interfacial bond between the material and the outsole substrate is less defined, such as where the material is highly diffused into the outsole substrate material (e.g., with a concentration gradient).

The sample is taken at a location along the outsole that provides a substantially constant material thickness (within +/−10% of the average material thickness), such as in a forefoot region, midfoot region, or a heel region of the outsole, and has a surface area of 4 square centimeters ($cm^2$). In cases where the material is not present on the outsole in any segment having a 4 $cm^2$ surface area, sample sizes with smaller cross-sectional surface areas can be taken and the area-specific measurements are adjusted accordingly.

B. Neat Material Sampling Procedure

This procedure can be used to obtain a sample of a material when the material is isolated in a neat form (i.e., without any bonded substrate). In this case, the material is extruded as a web or sheet having a substantially constant thickness (within +/−10% of the average material thickness), and cooled to solidify the resulting web or sheet. A sample of the material having a surface area of 4 cm² is then cut from the resulting web or sheet.

Alternatively, if a source of the material is not available in a neat form, the material can be cut from an outsole substrate of a footwear outsole, or from a backing substrate of a co-extruded sheet or web, thereby isolating the material. In either case, a sample of the material having a surface area of 4 cm² is then cut from the resulting isolated material.

2. Water Uptake Capacity Test

This test measures the water uptake capacity of the material after a given soaking duration for a sample taken with the above-discussed Footwear Sampling Procedure, or the Neat Material Sampling Procedure. The sample is initially dried at 60° C. until there is no weight change for consecutive measurement intervals of at least 30 minutes apart (e.g., a 24-hour drying period at 60° C. is typically a suitable duration). The total weight of the dried sample ($Wt_{sample,dry}$) is then measured in grams. The dried sample is then allowed to cool down to 25° C., and is fully immersed in a deionized water bath maintained at 25° C. After a given soaking duration, the sample is removed from the deionized water bath, blotted with a cloth to remove surface water, and the total weight of the soaked sample ($Wt_{sample,wet}$) is measured in grams.

Any suitable soaking duration can be used, where a 24-hour soaking duration is believed to simulate saturation conditions for the material of the present disclosure. Accordingly, as used herein, the expression "having a water uptake capacity at 5 minutes of . . . " refers to a soaking duration of 5 minutes, having a water uptake capacity at 1 hour of . . . " refers to a soaking duration of 1 hour, the expression "having a water uptake capacity at 24 hours of . . . " refers to a soaking duration of 24 hours, and the like.

As can be appreciated, the total weight of a sample taken pursuant to the Footwear Sampling Procedure includes the weight of the material of the present disclosure as dried or soaked ($Wt_{mat.,dry}$ or $Wt_{mat.,wet}$) and the weight of the outsole or backing substrate ($Wt_{substrate}$). In order to determine a change in weight of the material of the present disclosure due to water uptake, the weight of the substrate ($Wt_{substrate}$) needs to be subtracted from the sample measurements.

The weight of the substrate ($Wt_{substrate}$) is calculated using the sample surface area (e.g., 4 cm²), an average measured thickness of the substrate in the sample, and the average density of the substrate material. Alternatively, if the density of the material for the substrate is not known or obtainable, the weight of the substrate ($Wt_{substrate}$) is determined by taking a second sample using the same sampling procedure as used for the primary sample, and having the same dimensions (surface area and film/substrate thicknesses) as the primary sample. The outsole film of the second sample is then cut apart from the substrate of the second sample with a blade to provide an isolated substrate. The isolated substrate is then dried at 60° C. for 24 hours, which can be performed at the same time as the primary sample drying. The weight of the isolated substrate ($Wt_{substrate}$) is then measured in grams.

The resulting substrate weight ($Wt_{substrate}$) is then subtracted from the weights of the dried and soaked primary sample ($Wt_{sample,dry}$ and $Wt_{sample,wet}$) to provide the weights of the material of the present disclosure as dried and soaked ($Wt_{mat.,dry}$ and $Wt_{mat.,wet}$), as depicted below by Equations 1 and 2:

$$Wt_{mat.,dry} = Wt_{sample,dry} - Wt_{substrate} \quad \text{(Equation 1)}$$

$$Wt_{mat.,wet} = Wt_{sample,wet} - Wt_{substrate} \quad \text{(Equation 2)}$$

For material samples taken pursuant to the Neat Material Sampling Procedure, the outsole/backing substrate weight ($Wt_{substrate}$) is zero. As such, Equation 1 collapses to $Wt_{mat.,dry} = Wt_{sample,dry}$, and Equation 2 collapses to $Wt_{mat.,wet} = Wt_{sample,wet}$.

The weight of the dried material ($Wt_{mat.,dry}$) is then subtracted from the weight of the soaked material ($Wt_{mat.,wet}$) to provide the weight of water that was taken up by the material, which is then divided by the weight of the dried material ($Wt_{mat.,dry}$) to provide the water uptake capacity for the given soaking duration as a percentage, as depicted below by Equation 3:

$$\text{Water Uptake Capacity} = \frac{Wt_{mat.,wet} - Wt_{mat.,dry}}{Wt_{mat.,dry}}(100\%) \quad \text{(Equation 3)}$$

For example, a water uptake capacity of 50% at 1 hour means that the soaked material weighed 1.5 times more than its dry-state weight after soaking for 1 hour, where there is a 1:2 weight ratio of water to material. Similarly, a water uptake capacity of 500% at 24 hours means that the soaked material weighed 5 times more than its dry-state weight after soaking for 24 hours, where there is a 4:1 weight ratio of water to material.

3. Impact Energy Test

This test measures the ability of a sample of the material of the present disclosure to shed soil under particular test conditions, where the sample is prepared using the Neat Film Sampling Procedure (to obtain a suitable sample surface area). Initially, the sample is fully immersed in a water bath maintained at 25° C. for 24 hours), and then removed from the bath and blotted with a cloth to remove surface water.

The saturated test sample is then adhered to an aluminum block model outsole having a 25.4-millimeter thickness and a 76.2 millimeters×76.2 millimeters surface area, using a room temperature-curing two-part epoxy adhesive commercially available under the tradename "LOCTITE 608" from Henkel, Düsseldorf, Germany. The adhesive is used to maintain the planarity of the soaked sample, which can curl when saturated.

Four polyurethane cleats, which are commercially available under the trade name "MARKWORT M12-EP" 0.5-inch (12.7 millimeter) tall cleats from Markwort Sporting Goods Company, St. Louis, Mo., are then screwed into the bottom of the block in a square pattern with a 1.56-inch (39.6-millimeter) pitch. As a control reference, four identical cleats are attached to an aluminum block model outsole without having attached a sample of the material of the present disclosure.

To clog the model outsole cleats, a bed of soil of about 75 millimeters in height is placed on top of a flat plastic plate. The soil is commercially available under the tradename "TIMBERLINE TOP SOIL," model 50051562, from Timberline (subsidiary of Old Castle, Inc., Atlanta, Ga.) and was sifted with a square mesh with a pore dimension of 1.5 millimeter on each side. The model outsole is then compressed into the soil under body weight and twisting motion until the cleats touch the plastic plate. The weight is removed from the model outsole, and the model outsole is then twisted by 90 degrees in the plane of the plate and then lifted vertically. If no soil clogs the model outsole, no further testing is conducted.

However, if soil does clog the model outsole, the soil is knocked loose by dropping a 25.4-millimeter diameter steel ball weighing 67 grams onto the top side of the model outsole (opposite of the test sample and clogged soil). The initial drop height is 152 millimeters (6 inches) above the model outsole. If the soil does not come loose, the ball drop height is increased by an additional 152 millimeters (6 inches) and dropped again. This procedure of increasing the ball drop height by 152 millimeter (6 inch) increments is repeated until the soil on the bottom of the outsole model is knocked loose.

This test is run 10 times per test sample. For each run, the ball drop height can be converted into unclogging impact energy by multiplying the ball drop height by the ball mass (67 grams) and the acceleration of gravity (9.8 meters/second). The unclogging impact energy in Joules equals the ball drop height in inches multiplied by 0.0167. The procedure is performed on both the model outsole with the sample of material of the present disclosure and a control model outsole without this sample, and the relative ball drop height, and therefore relative impact energy, is determined as the ball drop height for the model outsole with the sample divided by the control model outsole without the sample. A result of zero for the relative ball drop height (or relative impact energy) indicates that no soil clogged to the model outsole initially when the model outsole was compressed into the test soil (i.e., in which case the ball drop and control model outsole portions of the test are omitted).

4. Average Cell Diameter Determination

As previously noted herein, the material, when present in the form of an open-cell foam, preferably has a specified average cell diameter. That diameter can be determined in accordance with an art-recognized procedure. Specifically, cell morphology can be assessed with a scanning electron microscope (SEM) that offers the ability to determine the average cell diameter of an open-cell foam. Three samples may be cut to dimensions of 100×100×7.5 mm at various locations along a sample of the foam. Image capture of cross-sectional cell structure on the foam surface can be facilitated by evenly applying a thin layer of black paint on the top of each test sample. An arbitrary square frame test area (of, for example, 247 square millimeters) may be chosen and data may be obtained from the measurement of about 500 cells within this test area.

Image analysis can be conducted using a Quantimet Image Analyzer offered by Leica Microsystems (Cambridge, UK). The image that may appear on a computer screen may need to be manipulated by adjusting the gray scale until most of the cell walls appear to be intact. When the image at an appropriate threshold has been defined, it may then be reconstructed into a form in which the computer can distinguish the features of interest and make the measurements for any specified requirement. This reconstruction can be accomplished by various image processing commands built into the analyzer's software. This software can also estimate various parameters, including, for example, cell area, equivalent cell diameter, and the aspect ratio. These parameters, as well as an average cell diameter, can be calculated according to the equations described below.

The mean area (A) of a set of open-cells with individual area ($A_i$) (where i=1 to n) is defined by Equation (5):

$$A = \left( \sum_{i=1}^{n} \frac{A_i}{n} \right) \quad \text{(Equation 5)}$$

Even though the cells within the foam may not be spherical, it is common practice to consider the equivalent cell diameter ($D_{equiv}$) as a characteristic dimension, calculated according to Equation (6):

$$d_{equiv,i} = \sqrt{\frac{4A_i}{\pi}} \quad \text{(Equation 6)}$$

An average cell diameter (D) can be determined by Equation (7):

$$D = \left( \sum_{i=1}^{n} \frac{D_{equiv,i}}{n} \right) \quad \text{(Equation 7)}$$

The aspect ratio, if desired, can be determined by the ratio of the maximum length to the minimum width of a truncated cell. Thus, when the ratio is 1, the cell shape can be considered to be circular, or almost circular.

5. Oil Absorption Test

The Oil Absorption Test may be used to determine the capacity of the of the material to absorb oil, especially, when the material is present in the form of an open-cell foam. This test uses SAE 10W-30 weight oil. The testing is generally described in U.S. Pat. No. 8,853,239, the disclosure of which is incorporated herein by reference. As described there, three samples of foam approximately 3×3×0.25 inches are used for each test. The samples may be obtained according to the Footwear Sampling Procedure or the Neat Material Sampling Procedure, described above.

The samples are floated on the oil surface for approximately six hours. The samples should not be squeezed or manipulated during the test. The samples are weighed before and after the test. The samples are pressed to a thickness of approximately 0.015 inch to remove oil, or some other thickness so long as each sample is similarly pressed. The sample is then placed between two polyethylene plates and squeezed using a mechanical vise. The samples are then doubled over and re-squeezed and weighed. The samples are then immediately returned to the oil. The samples are removed from the oil after approximately 6 hours and again weighed. The squeezing procedure can be repeated and the samples can be re-weighed. The samples are then returned to oil for a third time, here for 24 hours, to determine maximum oil absorption. The oil is allowed to drip from the sample for approximately one minute prior to weighing so that only retained oil is included in the weight measurement.

The oil absorption weight capacity of the sample is the ratio of (i) the weight of the sample plus the oil to (ii) the original weight of the sample. As noted above, the material, when present in the form of an open-cell foam, can absorb as much as 27 times its own weight in oil, according to the Oil Absorption Test. Thus, the open-cell foam material obtained in accordance with the Footwear Sampling Procedure or the Neat Material Sampling Procedure can have an oil absorption weight capacity of SAE 10W-30 oil of at least 27 times its weight, as determined according to the Oil Absorption Test.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Water Uptake

A sample of Oplex Foam (obtained from OPFLEX Technologies LLC (Indianapolis, Ind.)) was analyzed for the water uptake rate procedure described above after soaking the dried sample in deionized water for 60 minutes. The sample was circular, about 25 mm in diameter. The sample exhibited a 15% weight gain of material at 60 minutes.

Impact Energy

Three samples of open-cell foams were analyzed for soil shedding according to the Impact Energy Test described above using an aluminum model outsole to which each of the samples was affixed. The results for impact energy calculated from ball drop height are shown in Table I below. A sample of Oplex Foam was obtained from OPFLEX Technologies LLC (Indianapolis, Ind.).

TABLE I

Impact Energy Test Data

| Sample | Impact Energy (Joules) |
| --- | --- |
| OpFlex | 0 |
| Polypropylene foam 0.7 mm | 0.55 |
| Polypropylene foam 0.9 mm | 0.36 |

Field Test

Figure 19A:
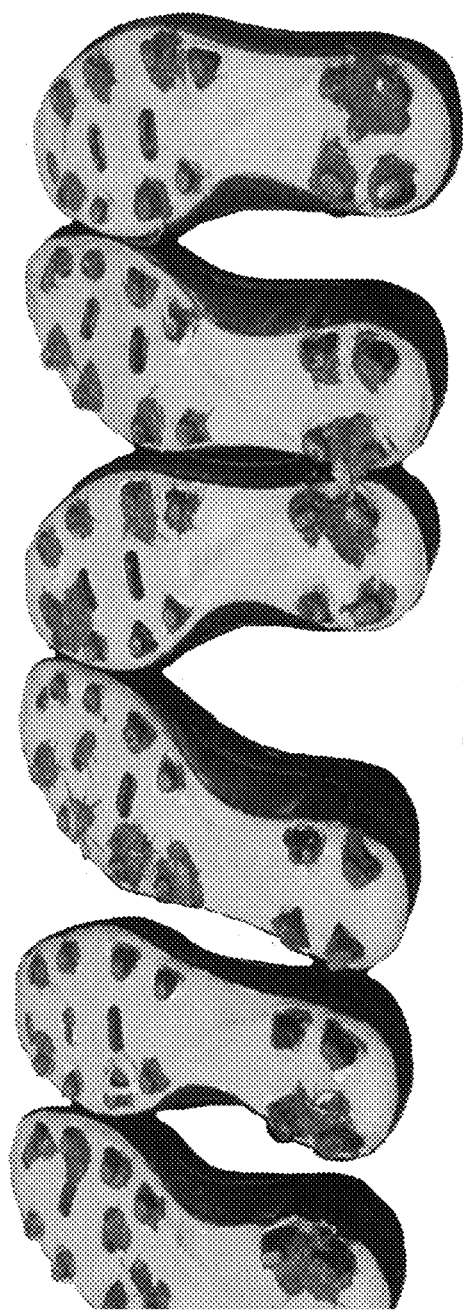
FIGS. 19C, 19D, 19E, and 19F are photographs of articles of footwear without a material according to the disclosure after being worn and used during wet and muddy game conditions.
Figure 19B:
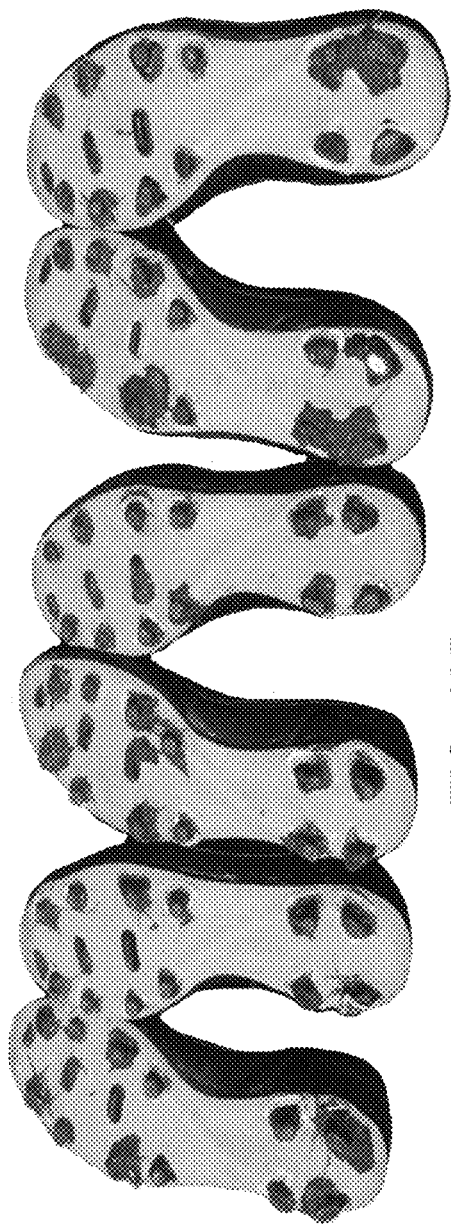
Figure 19E:
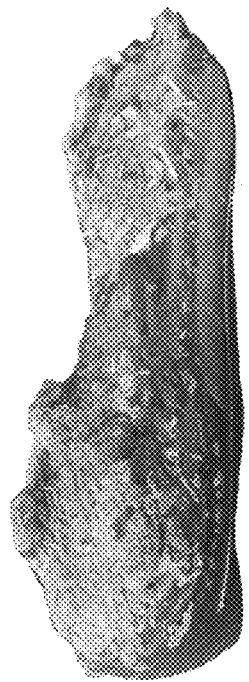
Figure 19F:
Figure 19C:
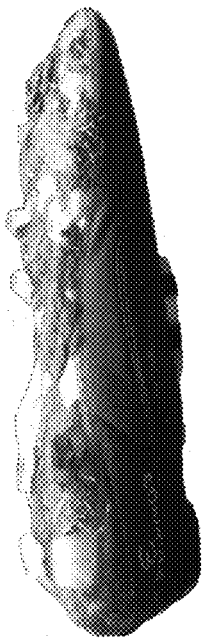
Figure 19D:
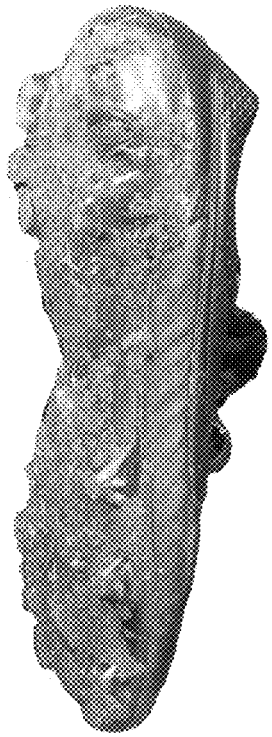

Standard soccer boots with thermoplastic polyurethane outsoles were modified by affixing material according to the disclosure to the ground-facing surfaces of their outsoles, including the cleats. In one field test, three pairs of boots included an Opflex Foam layer having a thickness of 3 mm, another three pairs of boots included an Opflex Foam layer having a thickness of 1 mm, and yet another pair of boots—control boots—did not include any such layer (i.e., the control soccer boots were identical to the test boots except the control boots did not include the material on the ground-facing surface of their outsoles). The boots, all initially clear of all debris, were then worn by players in a controlled outdoor setting while playing soccer for 90 minutes during a rainy day. 45 minutes were played on a natural grass field, and 45 minutes were played on an organic/sand/clay mix field. After the 90-minute playing session, the boots were investigated for the accumulation of soil (including debris) over the course of the game. FIG. 19 depicts the boots after this playing session. FIGS. 19A and 19B show the pairs of boots with the Opflex Foam layer. Specifically, FIG. 19A shows the ground-facing surface of the outsole having the 3 mm thick Opflex Foam layer. FIG. 19B shows the ground-facing surface of the outsole having the 1 mm thick Opflex Foam layer. FIGS. 19C, 19D, 19E, and 19F each show the ground-facing outsoles of the control pair of boots. As seen from the images in FIG. 19, the pairs of boots with the Oplex Foam accumulated little to no soil, while the pair of control boots accumulated a substantial amount of soil.

In another field test, the weight of boots with outsoles including the material according to the disclosure was compared to the weight of boots (control boots) that lacked the material according to the disclosure. The control pair of boots were soccer boots which were identical to the test boots except that they lacked any material (according to the disclosure). The test boots were identical to the control boots, except that greater than 80% of the ground-facing outsole thereof had affixed to it an Opflex Foam layer having a thickness of 1 mm. The boots, both initially clear of all soil, were initially weighed and then were worn by players in a controlled outdoor setting while playing soccer for 45 minutes during a rainy day on a natural grass field. After the 45-minute playing session, the boots were again weighed. The control boots increased in weight by 31%. In contrast, the test boots increased in weight by only 11%. In each case, the weight gain was attributed to accumulated soil, including grass clippings. Thus, the article of footwear having the material (in this case, open-cell foam material) secured to a ground-facing surface prevents or reduces soil accumulation on the outsole of the footwear, such that the article of footwear retains at least 10% or at least 20% less soil by weight as compared to a second article of footwear which is identical except that the second article of footwear is free of the open-cell foam material, when the two articles of footwear are worn under identical conditions.

Although the present disclosure has been described with reference to preferred embodiments, workers skilled in the art will recognize that changes may be made in form and detail without departing from the spirit and scope of the disclosure.

What is claimed is:

1. An article of footwear, the article comprising:
an outsole having a ground-facing surface, an open-cell foam material secured to at least a portion of the ground-facing surface and a plurality of traction elements secured to the ground-facing surface, wherein the open-cell foam material has an average cell diameter ranging from 0.65 mm to 1.4 mm, wherein the open-cell foam material comprises an ethylene-alkyl acrylate copolymer component; and
an upper secured to the outsole;
wherein the article of footwear prevents or reduces soil accumulation on the outsole such that the article of footwear retains at least 10% less soil by weight as compared to a second article of footwear which is identical to the article of footwear except that the second article of footwear is free of the open-cell foam material.

2. The article of claim 1, wherein the plurality of traction elements comprise a plurality of cleats.

3. The article of claim 2, wherein the material is not present on or in direct contact with the plurality of cleats.

4. The article of claim 1, wherein the outsole as characterized by a Neat Material Sampling Procedure has an impact energy of from 0 Joules to 0.6 Joules according to an Impact Energy Test.

5. The article of claim 1, wherein the open-cell foam material as characterized by a Neat Material Sampling Procedure has an absorption weight capacity of SAE 10W-30 oil of at least 27 times its weight of the open-cell foam material according to the Oil Absorption Test.

6. The article of claim 1, wherein the open-cell foam material has a melt flow rate in a range of between about 0.5 g/10 mins. and about 100 grams/10 mins according to ASTM D1238 using a 2160 g weight and a temperature of 190° C.

7. The article of claim 1, wherein the ethylene-alkyl acrylate copolymer component consists of an ethylene-alkyl acrylate copolymer or a combination of two or more ethylene-alkyl acrylate copolymers.

8. The article of claim 7, wherein a concentration of the ethylene-acrylate copolymer component present in the open-cell foam is from 40 to 80 parts per hundred by weight based on a total polymer content of the open-cell foam.

9. The article of claim 7, the ethylene-alkyl acrylate copolymer component comprises a copolymer of ethylene and methyl acrylate, or a copolymer of ethylene and ethyl acrylate, or a combination of both.

10. The article of claim 7, wherein the ethylene-alkyl acrylate copolymer component comprises an ethylene-alkyl acrylate copolymer having an alkyl acrylate content of between 3% and 45%, based on a total weight of the copolymer.

11. The article of claim 1, wherein the open-cell foam material has a thickness in a dry state of about 0.1 mm to about 12 mm.

12. The article of claim 1, wherein the open-cell foam material has a tensile strength of 75 kiloPascals (kPa) to 250 kPa, as determined according to ASTM D882.

13. The article of claim 1, wherein the open-cell foam material has a Young's modulus of from 0.4 megaPascals (MPa) to 2.5 MPa.

14. The article of claim 1, wherein each of the plurality of traction elements comprises a terminal edge, and wherein the open-cell foam material is not present on the terminal edges of any of the plurality of traction elements.

15. The article of claim 1, wherein one or more of the traction elements is selected from the group consisting of: a cleat, a stud, a spike, and a lug.

16. The article of claim 1, wherein the traction elements are integrally formed with the outsole.

17. The article of claim 1, wherein the traction elements are removable traction elements.

18. A method of use of an article of footwear, the method comprising:
providing an article of footwear comprising an outsole having a ground-facing surface, an open-cell foam material secured to at least a portion of the ground-facing surface and a plurality of traction elements secured to the ground-facing surface, wherein the open-cell foam material has an average cell diameter ranging from 0.65 mm to 1.4 mm, wherein the open-cell foam material comprises an ethylene-alkyl acrylate copolymer component; and
wearing the article of footwear under conditions in which the outsole comes into direct contact with wet soil, wherein the article of footwear prevents or reduces accumulation of the soil on the outsole such that the article of footwear retains at least 20% less soil by weight as compared to a second article of footwear worn under identical conditions wherein the second article of footwear is identical to the article of footwear except that the second article of footwear is free of the open-cell foam material.

19. The method of claim 18, wherein the plurality of traction elements comprise a plurality of cleats.

20. The method of claim 19, wherein the open-cell foam is not present on or in direct contact with the plurality of cleats.

21. The method of claim 18, wherein the outsole as characterized by a Neat Material Sampling Procedure exhibits an impact energy of from 0 Joules to 0.6 Joules according to an Impact Energy Test.

22. The method of claim 18, wherein the outsole as characterized by a Neat Material Sampling Procedure exhibits an impact energy of from 0.2 Joules to 0.4 Joules.

23. The method of claim 18, wherein the ethylene-alkyl acrylate copolymer component consists of an ethylene-alkyl acrylate copolymer or a combination of two or more ethylene-alkyl acrylate copolymers.

24. The method of claim 23, wherein a concentration of the ethylene-acrylate copolymer component present in the open-cell foam material is from 40 to 80 parts per hundred by weight based on a total polymer content of the open-cell foam material.

25. The method of claim 1, wherein each of the plurality of traction elements comprises a terminal edge, and wherein the open-cell foam material is not present on the terminal edges of any of the plurality of traction elements.

26. The method of claim 1, wherein one or more of the traction elements is selected from the group consisting of: a cleat, a stud, a spike, and a lug.

27. The method of claim 1, wherein the traction elements are integrally formed with the outsole.

28. The method of claim 1, wherein the traction elements are removable traction elements.

* * * * *